Nov. 11, 1958 H. L. THOLSTRUP ET AL 2,859,851

SHIFT FUNCTIONS CIRCUITS

Filed April 30, 1956 22 Sheets-Sheet 1

INVENTORS
HENRY L. THOLSTRUP
JOHN A. SKINNER

BY

ATTORNEY

INVENTORS
HENRY L. THOLSTRUP
JOHN A. SKINNER
BY [signature]
ATTORNEY

INVENTORS
HENRY L. THOLSTRUP
JOHN A. SKINNER
BY
ATTORNEY

INVENTORS
HENRY L. THOLSTRUP
JOHN A. SKINNER
BY P. E. Henninger
ATTORNEY

SHIFT FUNCTIONS CIRCUITS

Filed April 30, 1956 22 Sheets-Sheet 5

INVENTORS
HENRY L. THOLSTRUP
JOHN A. SKINNER
BY
ATTORNEY

Nov. 11, 1958 H. L. THOLSTRUP ET AL 2,859,851

SHIFT FUNCTIONS CIRCUITS

Filed April 30, 1956 22 Sheets-Sheet 6

Inventors
HENRY L. THOLSTRUP
JOHN A. SKINNER

BY [signature]
Attorney

INVENTORS
HENRY L. THOLSTRUP
JOHN A. SKINNER
BY
ATTORNEY

Nov. 11, 1958 H. L. THOLSTRUP ET AL 2,859,851

SHIFT FUNCTIONS CIRCUITS

Filed April 30, 1956 22 Sheets-Sheet 8

*INVENTORS*
HENRY L. THOLSTRUP
JOHN A. SKINNER

*BY* P. E. Henninger

ATTORNEY

Nov. 11, 1958 H. L. THOLSTRUP ET AL 2,859,851

SHIFT FUNCTIONS CIRCUITS

Filed April 30, 1956 22 Sheets-Sheet 9

INVENTORS
HENRY L. THOLSTRUP
JOHN A. SKINNER
BY [signature]
ATTORNEY

*INVENTORS*
HENRY L. THOLSTRUP
JOHN A. SKINNER
*BY* [signature]
ATTORNEY

Nov. 11, 1958 H. L. THOLSTRUP ET AL 2,859,851

SHIFT FUNCTIONS CIRCUITS

Filed April 30, 1956 22 Sheets-Sheet 13

Nov. 11, 1958 H. L. THOLSTRUP ET AL 2,859,851

SHIFT FUNCTIONS CIRCUITS

Filed April 30, 1956 22 Sheets-Sheet 17

INVENTORS
HENRY L. THOLSTRUP
JOHN A. SKINNER
BY [signature]
ATTORNEY

INVENTORS
HENRY L. THOLSTRUP
JOHN A. SKINNER
BY
ATTORNEY

United States Patent Office 2,859,851

Patented Nov. 11, 1958

2,859,851

SHIFT FUNCTIONS CIRCUITS

Henry L. Tholstrup, Rochester, N. Y., and John A. Skinner, Bethesda, Md.; said Tholstrup assignor to Commercial Controls Corporation, Rochester, N. Y., a corporation of Delaware Application April 30, 1956, Serial No. 581,632

10 Claims. (Cl. 197—20)

This invention relates to apparatus for processing data represented in coded form, and more particularly to a system including a data tape reader, a printer and a tape punch in which a record may be generated, duplicated, regenerated in modified form, or read and transcribed either as a direct representation of the data read from a record tape or in modified form according to a unique system of code interpretation. Accordingly, it is the broad objective of this invention to provide apparatus of the type indicated which is capable of selectively ignoring or variously interpreting certain of the signals generated during the operation of the apparatus.

In apparatus of the type referred to, it is customary to use a record strip on which code designations have been successively recorded to represent, respectively, according to a selected combinational code the intelligence, or data which it is desired to process and certain functional signals for controlling the operation of the apparatus. In a specific form of the invention, the record strip or tape from which the original data is read assumes the form of punched paper tape in which each bit of intelligence is represented in a combinational code.

A typical example of the apparatus of the character referred to comprises a record tape reading unit through which the record tape is fed and which includes a sensing mechanism operable to sense successively the code designations punched into the record tape; a typewriter which has a platen for supporting a copy sheet, a plurality of character types operably arranged with respect to the platen and a plurality of character key members, or actuators, corresponding, respectively, to the types and adapted to effect operation of the latter; and a tape punch which is responsive to signals transmitted either directly from the tape reader or from the typewriter, whether such signals from the typewriter are generated as a result of manual typewriter operation, or as a result of typewriter operation under control of a tape read in the tape reader.

As the record tape is fed past the sensing mechanism of the tape reader and the code designations are successively sensed thereby, the sensing mechanism, when the reader is electrically connected to the typewriter, effects operation of the character key members corresponding to the designation sensed, and thereby transcribes the recorded intelligence or data on the copy sheet. Provision is also made for controlling, by code designations recorded on the record tape, the usual functional operations of the typewriter, such as spacing, tabulating, carriage return and the like which are necessary to transcribe correctly the recorded intelligence.

The typewriter also includes functional key members controlling, respectively, the functional operations of the typewriter, and, as in the case of a character code designation, when a functional code designation is sensed, the sensing mechanism controls the operation of the corresponding functional key member to effect the desired operation of the typewriter. Furthermore, as the typewriter is operated either manually or under control of a record tape being read in the tape reader, a decoding unit within the typewriter generates signals by which the tape punch may be controlled. By this means it is possible to regenerate a tape partially under control of a record tape being read in the tape reader and partially under control of manual manipulation of the typewriter.

It is a prime objective of this invention to so construct the typewriter that signals originating from the record tape in the tape reader are so routed in the typewriters as to perform their normal functions, or under certain conditions, to be described, to perform different functions within either the typewriter or tape punch from those ordinarily resulting from the reading of a given code or to entirely ignore certain signals originating from the record tape.

Other objects of the invention will be pointed out in the following description and claims and illustrated in the accompanying drawings which disclose by way of example the principles of the invention and the best mode, which has been contemplated, of applying those principles.

Figures 4, 5:
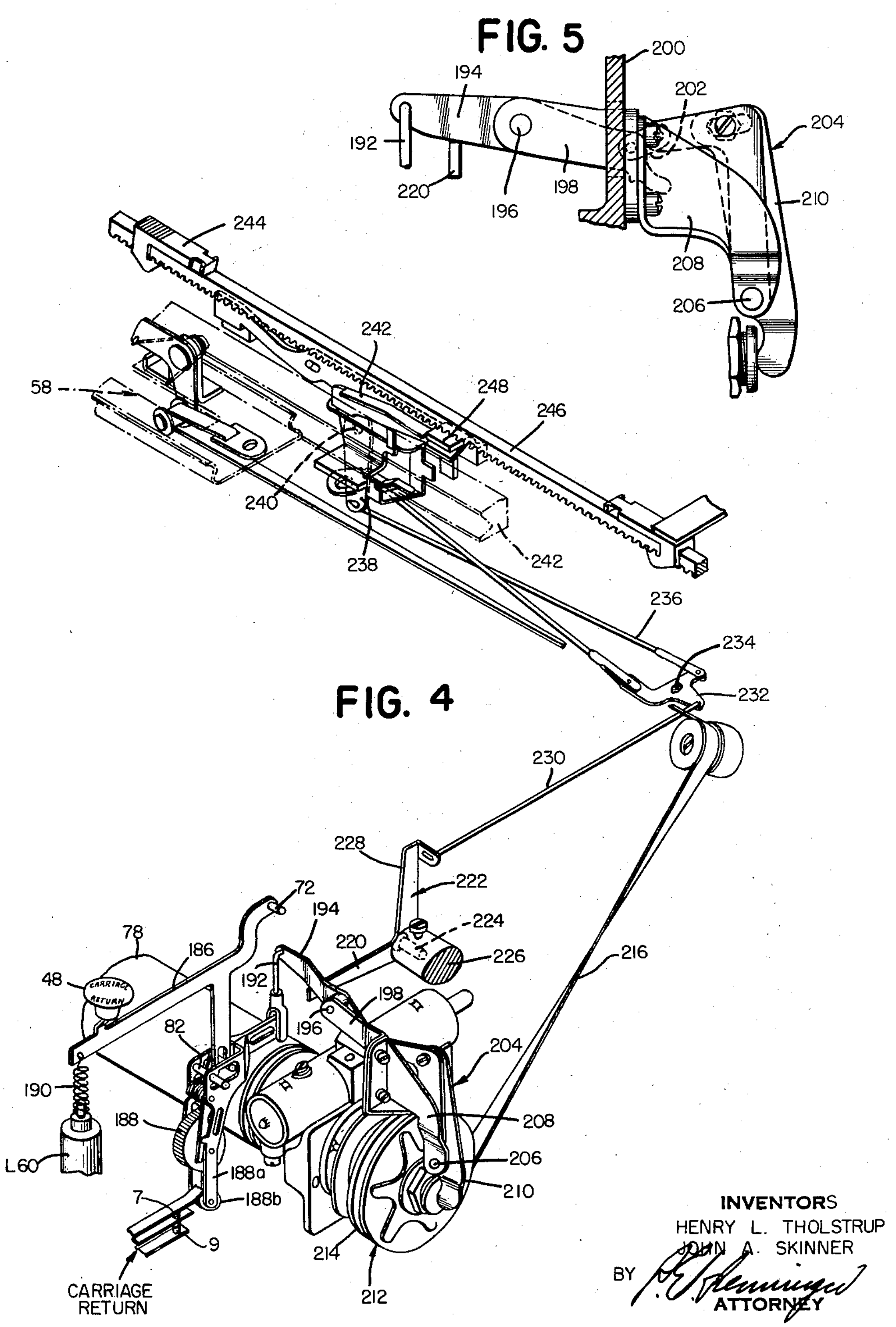
Figure 6:
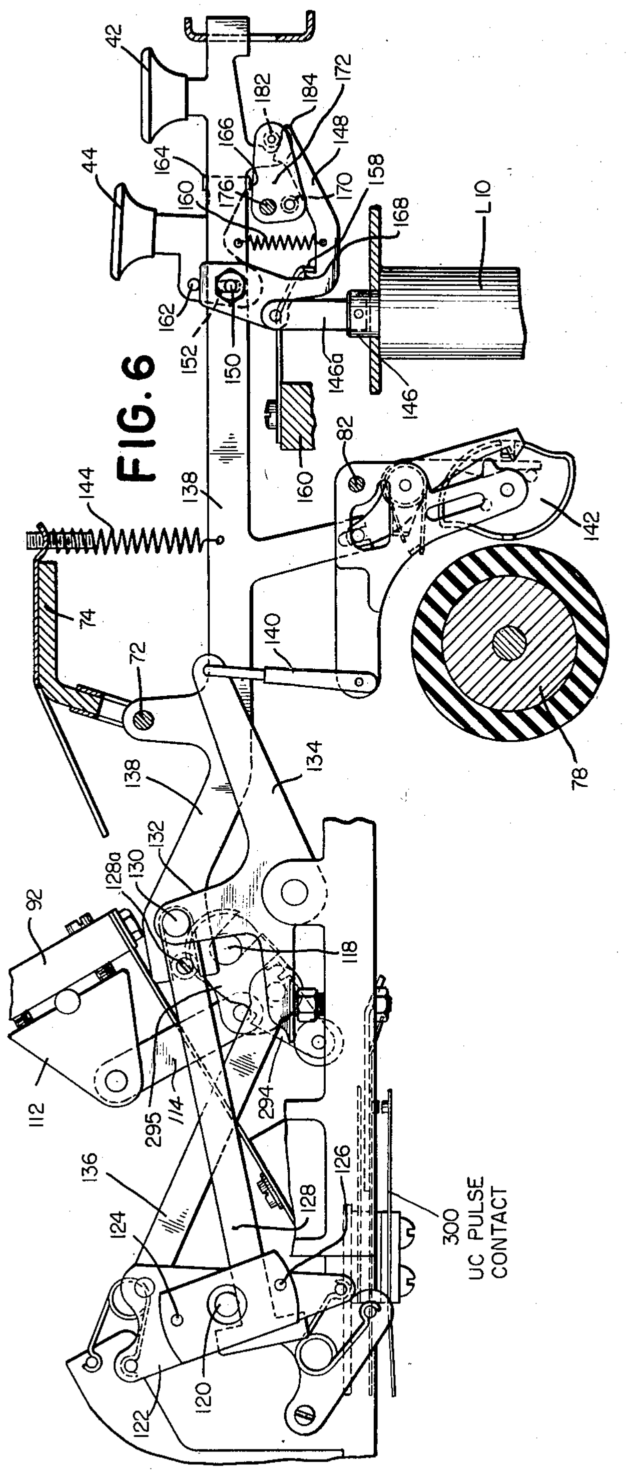
Figure 7:
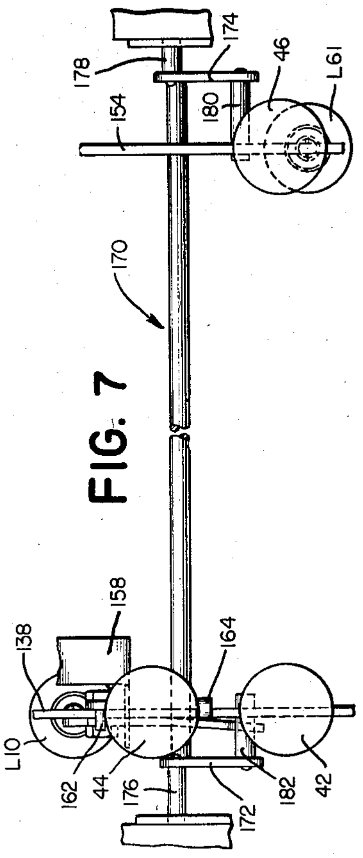
Figures 8, 9, 10:
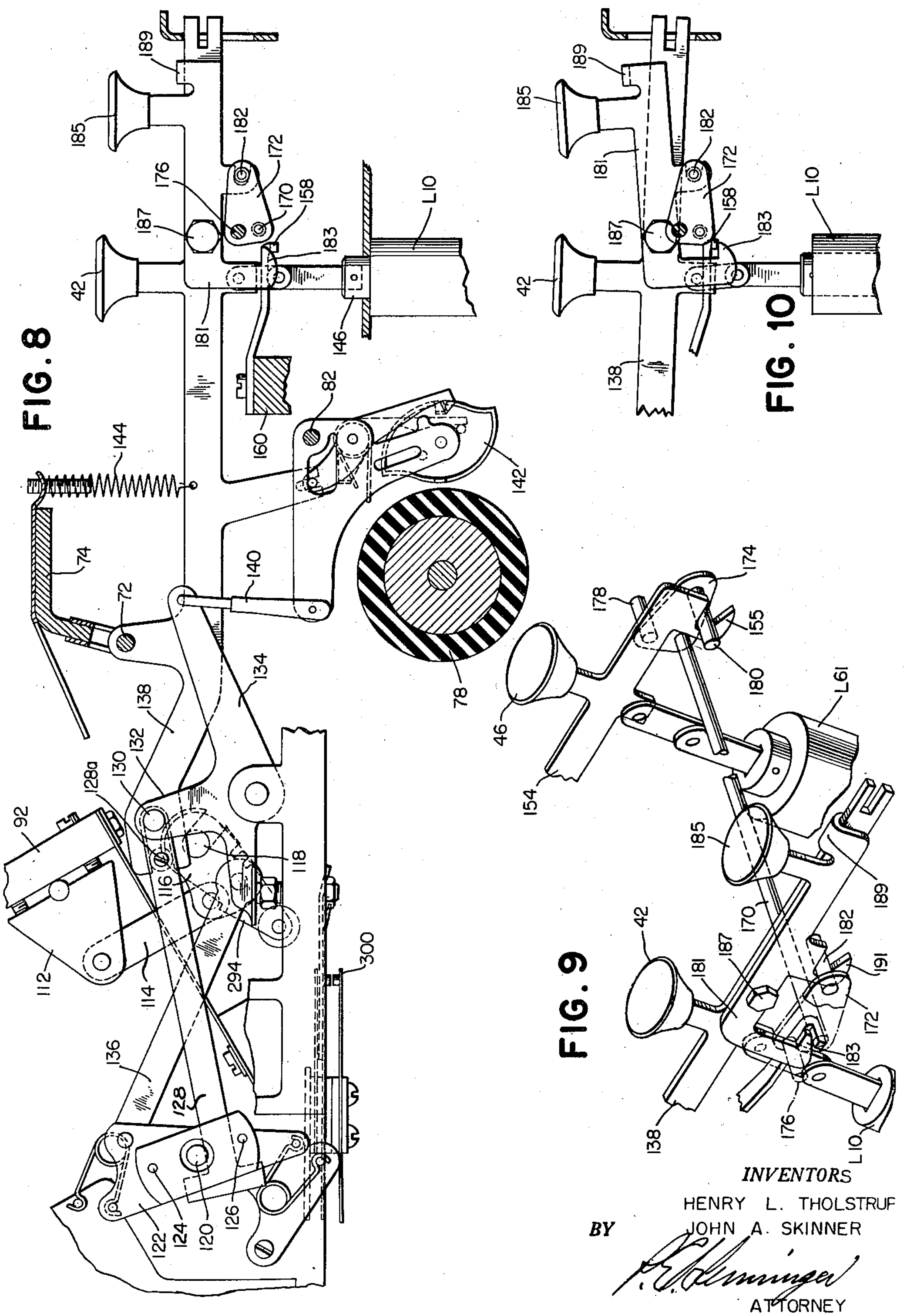
Figures 11, 12:
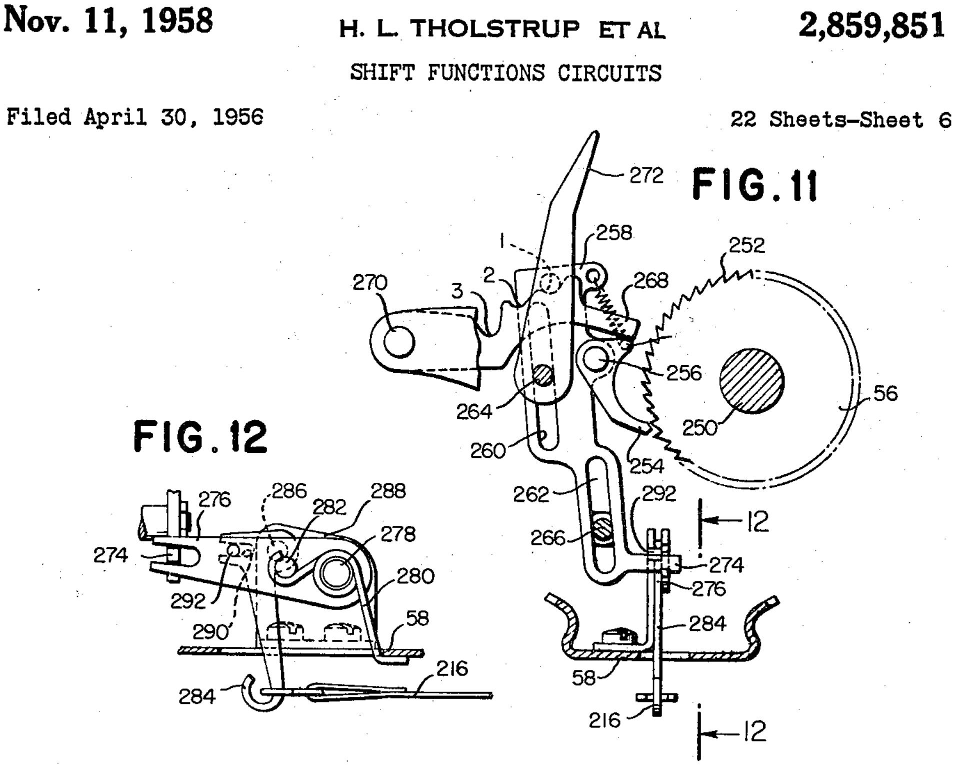
Figure 14:
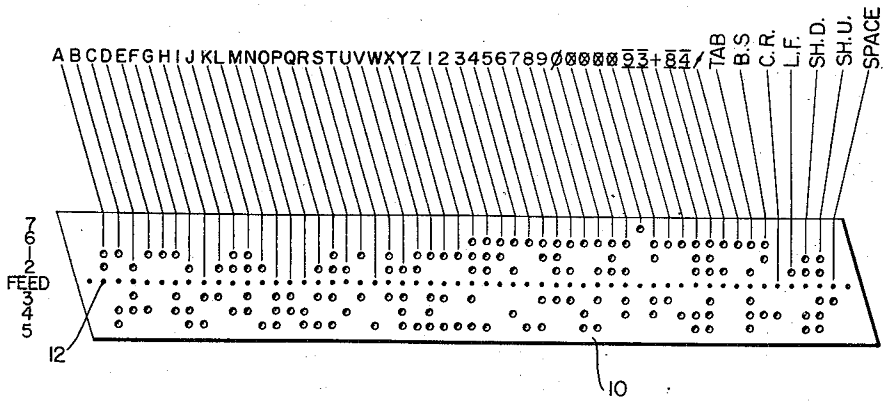
Figure 13:
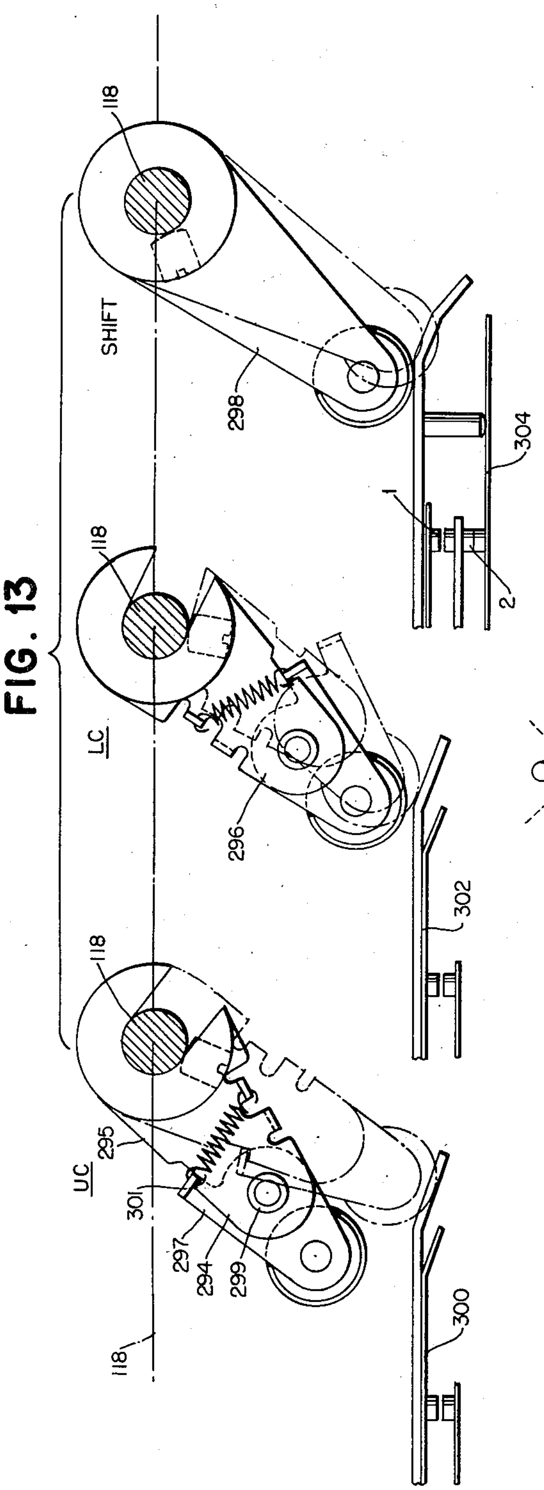
Figure 13A:
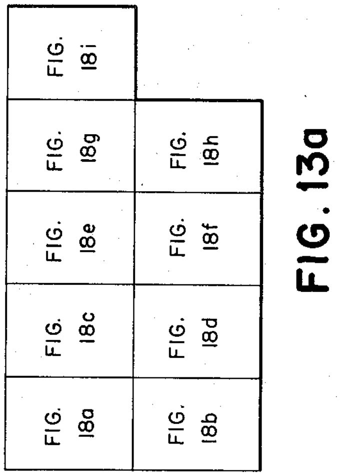
Figure 19:
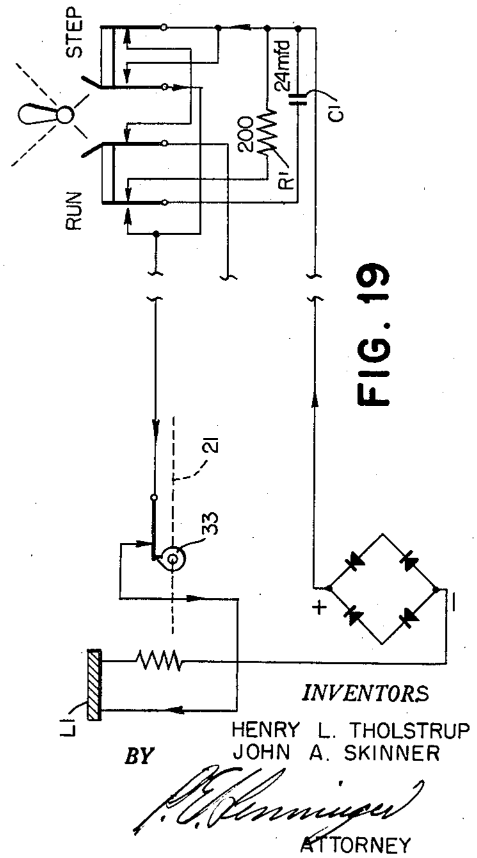
Figure 15:
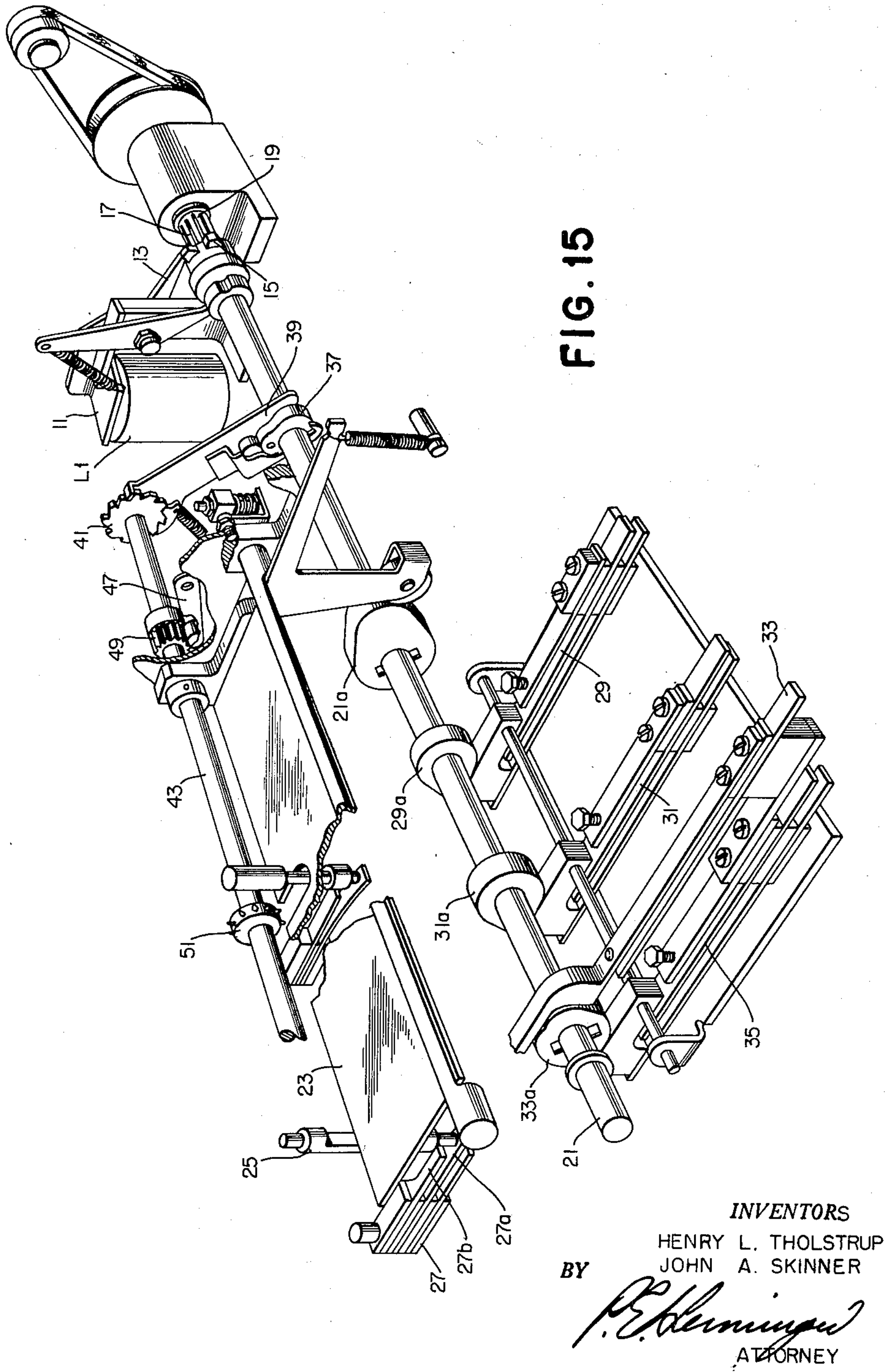
Figure 16:
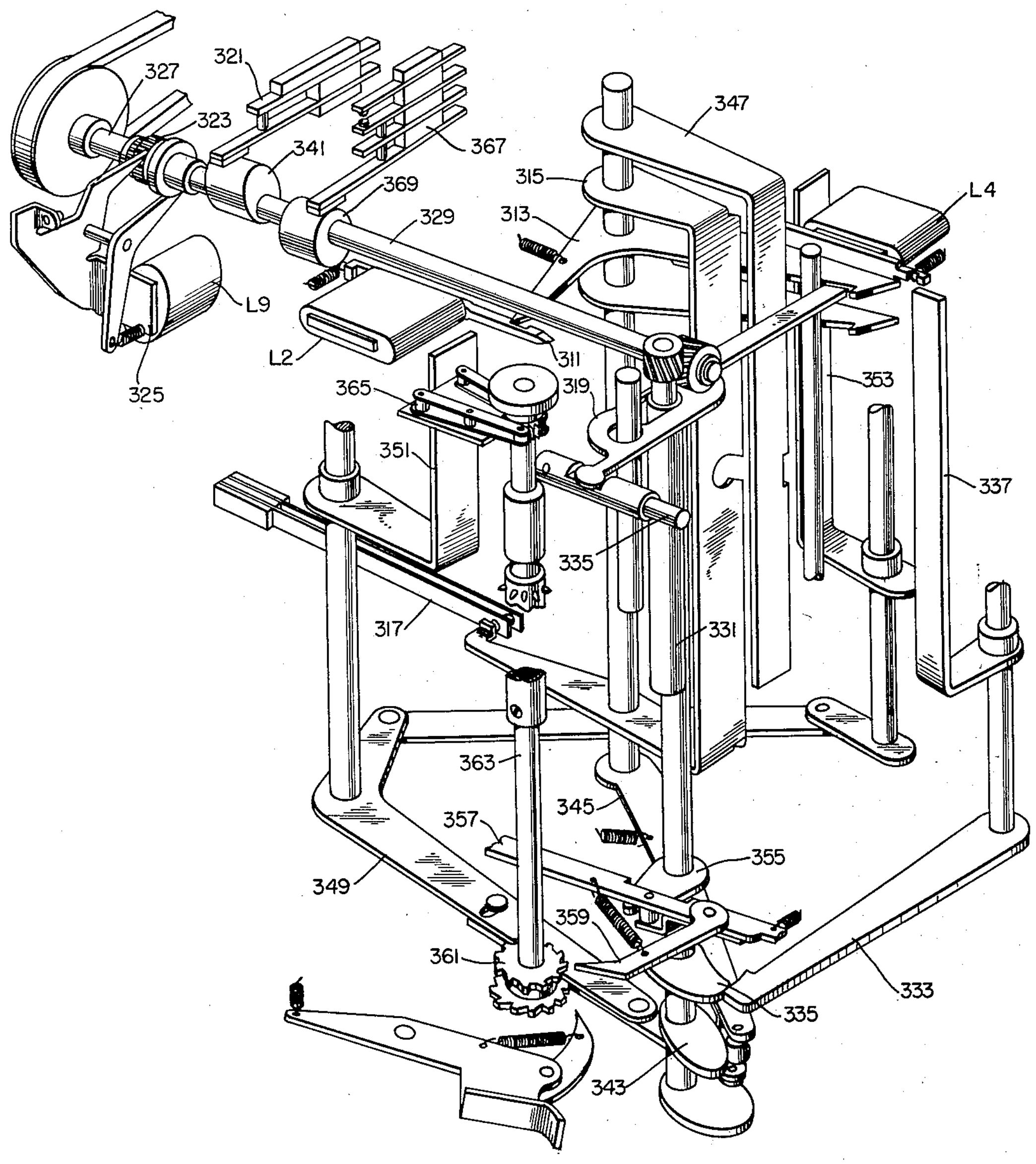
Figure 17:
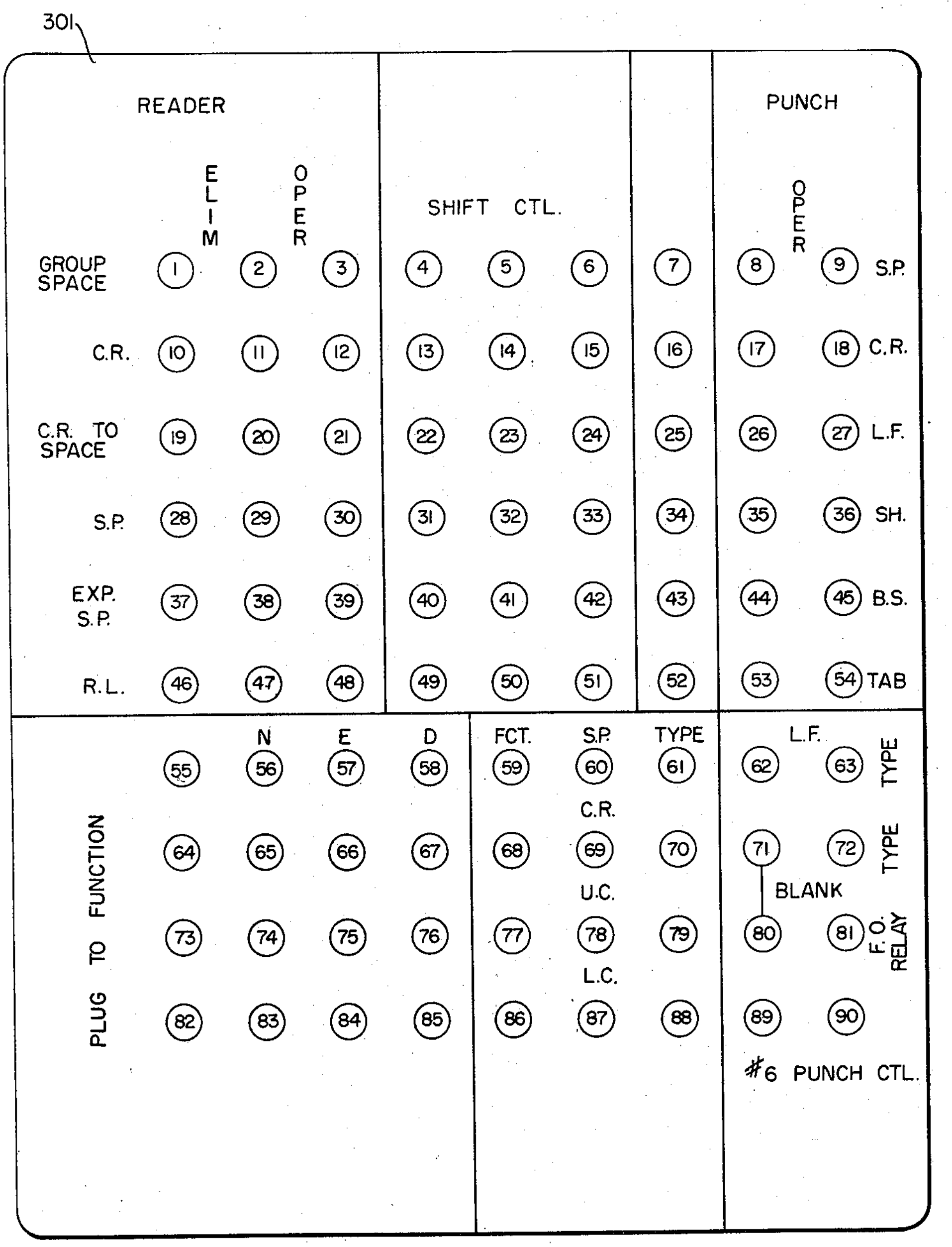

Fig. 4 comprises the carriage return mechanism of the typewriter;

Fig. 5 is a detail showing the carriage return clutch control linkage system;

Figs. 6 and 7 relate to the case shift mechanism of the typewriter;

Figs. 8, 9 and 10 illustrate the typewriter case shift mechanism having a shift lock and release arrangement of modified form;

Figs. 11 and 12 are detailed views of line spacing mechanism;

Fig. 13 illustrates the details of contact actuators associated with the case shift mechanism of the typewriter;

Fig. 13*a* is a layout showing the manner in which circuit diagrams of Figs. 18*a*–18*i* are assembled to produce the overall wiring diagram of the system;

Fig. 14 is a section of paper tape having therein the perforated code combinations utilized for control of the system;

Fig. 15 illustrates the essentials of the tape reader;

Fig. 16 illustrates the essentials of the tape punch;

Fig. 17 is the layout of a control panel associated with the typewriter circuits;

Figs. 18*a* through 18*i* constitute, in diagrammatic form, the electrical control system;

Fig. 19 is a wiring diagram of a modified reader step-run switch circuit; and

Figs. 20 through 26 are simplified circuit diagrams illuminating manipulation of the case shift signals.

Before considering in detail the construction and operation of the illustrated embodiment of the invention, it may be helpful to consider first one practical example of a preselected combinational code by means of which the intelligence, such, for example, as a letter or a functional operation, which it is desired to transcribe or perform can be recorded on a record strip or tape. Fig. 14 of the drawings shows a portion of a record tape 10 into which has been punched all of the code hole designations of a combination seven hole code. The seven code positions are indicated at the left end of the tape section 10 by reference numerals 1 through 7, and the code holes for each bit of information are arranged in a vertical column or recording or data field. At the upper edge of the tape is placed the particular character or typewriter function corresponding to the code designation in that field. The small holes 12 at the center of the tape 10 and within each of the several recording fields are for the purpose of feeding the tape lengthwise during the reading or sensing operation. The tape may be punched by any suitable means such, for example, as by the typewriter controlled punch disclosed in H. L. Tholstrup Patent No. 2,436,126, issued February 17, 1948.

In the tape section of Fig. 14 certain of the functional code designations should be particularly noted since this invention concerns itself chiefly with the typewriter functions produced upon the reading of certain of the functional codes. Thus, it may be seen by reference to Fig. 14 that the carriage return function is represented by a —4— hole in the tape, whereas the line feed operation is indicated by a —2— hole. In similar manner, it may be noted that the code ordinarily resulting in the shifting of the type basket to upper case position is indicated by the 1—2—4 and 5 holes in a given field, whereas the shift release which results in the shifting of the type basket to the lower case position is indicated by the 1—2—3—4 and 5 holes of the field. The space function is called for when a —3— hole is sensed.

Figure 1:
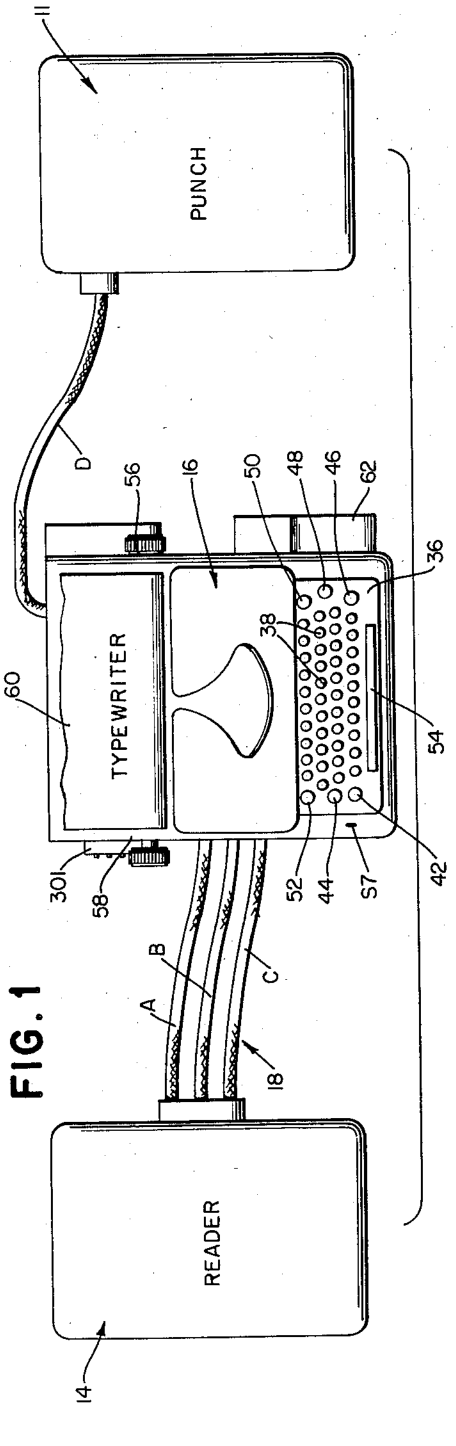
Figure 1 is a plan view of a tape reader, a typewriter, and a tape punch comprising the system to which the invention has been applied.

In Fig. 1 of the drawings, the reference numeral 14 represents a reading unit adapted to feed a record tape and read therein the code holes appearing in successive data fields. The reading unit may be of the general character disclosed in H. L. Tholstrup Patent No. 2,378,371, and since its specific mechanism forms no part of the present invention, only brief reference need be made thereto. In Fig. 1 it will be seen that the tape reading unit 14 is connected to a typewriter 16 by means of an electrical cable 18, which contains the necessary individual circuit wires (not shown) for effecting operation of the apparatus. The cable 18 is composed of cable sections A, B and C.

The typewriter 16 which is shown in plan in Fig. 1 and in detailed construction thereof in Figs. 3 through 13, is a well known commercial form of power driven typewriter having such modifications and additions as required to adapt it to this invention. Insofar as the conventional features of the typewriter are concerned, they will be described only generally, since they are well known in the art. The additions and modifications will be described more specifically to render the description of the present invention intelligible.

In Fig. 1 the typewriter 16 is shown as comprising the usual keyboard 36, comprising the character keys 38 which operate corresponding type bars 40 (Fig. 3), and the functional keys which include the shift key 42 (upper case), the shift lock key 44 (upper case and lock), the shift release key 46 (lower case), the carriage return key 48, the back space key 50 and the tabulating key 52. The space bar is indicated by the reference numeral 54. The typewriter 16 also comprises the conventional, rotatable platen 56 mounted on the typewriter carriage 58, the platen 56 being adapted to support a copy sheet 60 on which the data recorded in the tape 10, or a modified interpretation thereof, is automatically typed. At the lower left hand side of the typewriter 10 as viewed in Fig. 1 is a power switch S7 which, when closed, connects a source of alternating current with the typewriter motor. At the lower right side of the typewriter, as viewed in Fig. 1, is mounted a control panel 62, shown in detail in Fig. 2 directly below the typewriter of Fig. 1, which includes a switch S11 for turning on the punch and a pair of three-positioned switches S8 and S9. The switch S8 is a step-run switch for the tape reader and the switch S9 is a step-run switch for the tape punch. The switch S12 is an insert switch which when thrown into one position will permit the typewriter to operate under manual control while the tape reader is at rest, and when in its other position it serves to condition the circuits for synchronous reading in the tape reader and transcribing in the typewriter. The switch S8 is for controlling the tape reader 14, this being a three-position switch which when in its first position serves to stop tape reader action, and which when in its second position conditions the tape reader for sequential reading of record fields in the tape, but when in its third position results in the reading of a single code field followed by an interruption of the reading action.

The tape punch 11 of Fig. 1 is shown connected to the typewriter by a cable D. The punch 11 has a control panel, shown directly below in Fig. 2, on which are located the switches S13, S14, S15 and S16. Within the tape punch is a spindle (not shown) for holding a supply of paper tape which is fed past a punch block at which point a plurality of punches are adapted to punch holes into transverse data fields in coded form.

Figure 2:
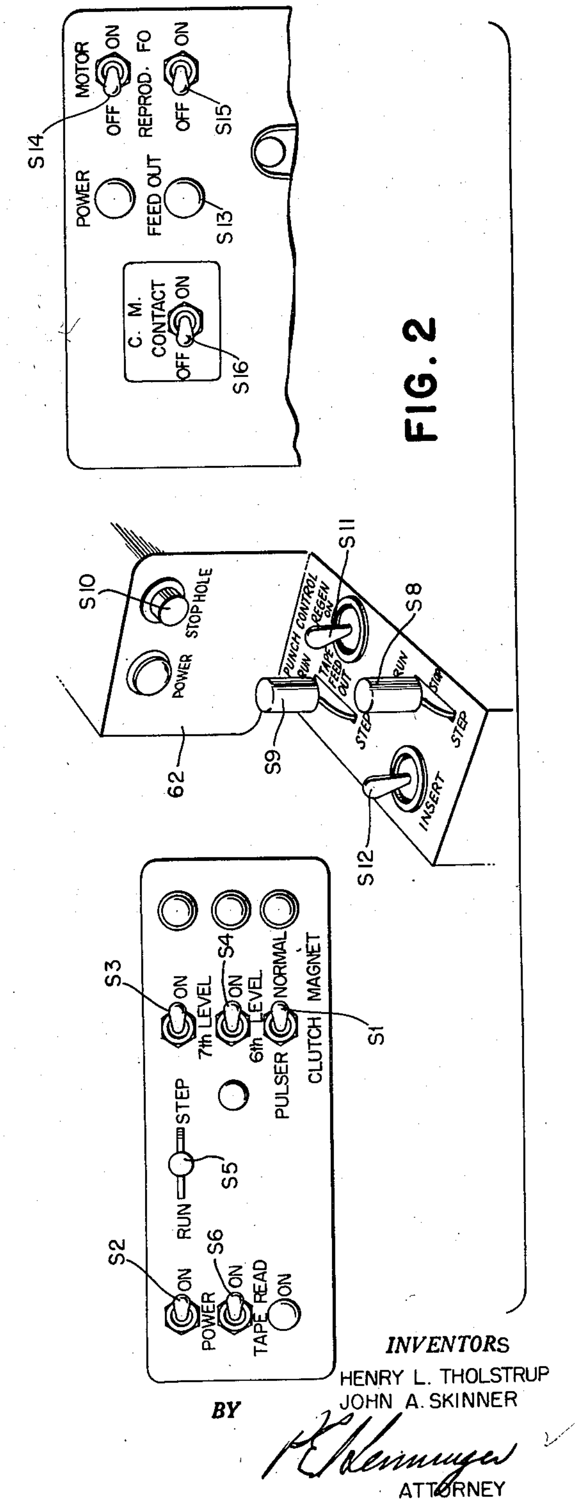
Fig. 2 shows, from left to right, the details of the tape reader control panel, the typewriter control panel, and the tape punch control panel.

In Fig. 2, and located directly below the tape reader of Fig. 1, is illustrated the control panel on the face of the tape reader. This control panel includes the switches S1, S2. S3, S4, S5 and S6.

When the tape reader, the typewriter and the tape punch are electrically connected with each other, as shown in Fig. 1, signals generated in the tape reader by reason of a record tape being read therein will control certain functions in the typewriter, and the typewriter will recode the data and transmit the same by way of cable D to the tape punch 11 for regenerating a record tape in the punch. Manual manipulation of the typewriter will also result in the transmittal of signals from the typewriter through the cable D to the tape punch for the control of the same. The tape reader 14 may be directly connected to the tape punch 11 through cables B and D, whereby a tape being read in the tape reader will be reproduced in the tape punch.

The tape reader is of the general type shown in H. L. Tholstrup Patent No. 2,378,371, and only such fundamentals thereof need be illustrated and described herein to show the application of the present invention thereto. The tape reader has as its primary function the translation of characters, represented by a combination of code holes punched in a paper tape, to generate a single electrical signal for each combination of holes in the tape. The signals read from the tape are routed through a relay translating network such as that shown in the aforesaid patent wherein the combination of signals obtained upon the reading of a data field in the tape is translated into a single electrical impulse representative of the character or function called for by the code. From the relay translating network the respective signals may be transmitted to the operating solenoids of the electric typewriter or to selector magnets of the punch. When the coded tape is fed through the reader, feeler pins move up through code holes in the tape. A contact will close under each feeler pin having a code hole above it. The contacts of the feeler pins are electrically connected to their respective relays in the translating network. Therefore, each time a feeler pin moves through a code hole in a tape its corresponding relay in the translating network is energized. The relays in the translator set up an A. C. path to a typewriter solenoid which corresponds to the code in the tape, and this solenoid pulls down its repective key lever, typing a character or operating a function as the case may be. When the reader is directly connected to the punch for the purpose of reproducing tape, the selector magnets in the punch are energized when a corresponding feeler pin contact in the reader closes. The punch will perforate a duplicate of the tape being read in the reader if directly connected, whereas the intelligence read from the tape in the reader may be altered in its passage through a control panel on the typewriter.

Fig. 15 is a fragmentary drawing of the essential elements of the tape reader which is deemed sufficient to explain the fundamentals of the reader mechanism. In this figure, when the clutch magnet coil L1 is energized in the reader, it attracts the clutch magnet armature 11 which releases the clutch lever 13, allowing the clutch dog 15 to engage a tooth in the ratchet 17 of the continuously running ratchet shaft 19. This starts the clutch cam shaft 21 to rotate, moving the pin operating blade 13, which in turn releases the feeler pins 25. The pins 25 which move in a guide block (not shown) rest on a movable contact spring 27. When the operating blade releases the pins 25, the tension of the spring contacts 27 forces the feeler pins 25 up through the holes in the tape table (not shown) and against the tape being read. If there is a code hole in the tape above any pin, the movable pin contact 27*a* will force the feeler pin through the code hole in the tape. At approximately 14° rotation of the clutch shaft the movable pin contact will close a circuit with a stationary contact 27*b* located just above it.

Each contact pin is connected to a level of translator relays. When the clutch shaft 21 has rotated approximately 47°, a D. C. common contact 29 closes, energizing the translator relay coils corresponding to the code holes in the tape. An A. C. common contact 31 closes at approximately 104° rotation of the shaft. This allows enough time for the selected set of relays to become energized and fully operative. When the A. C. common contact 31 closes, it closes a path through the translator relays to a solenoid in the typewriter or to the selector magnets in the punch, if the reader is directly connected to the punch. If the circuit is connected to the typewriter, a typewriter solenoid becomes energized, tripping the corresponding cam and typing a character or performing a function as the case may be. A pair of clutch magnet contacts 33 are adjusted so that they open at about 53° rotation of the clutch shaft. This breaks the direct current source to the clutch magnet coil, deenergizing it and releasing the clutch magnet armature. There are a set of feed out contacts 35 which close at approximately 166° rotation of the shaft. This completes a positive direct current circuit to the punch clutch magnet (if the reader is directly connected to the punch) through the interconnecting cable. The alternating current common contacts 31 open about 20° sooner than the direct current common contacts 29 to prevent possible arcing of the translator relay points. The alternating current contacts 31 break at about 245° rotation. By cam action the pin operating blade 23 moves the feeler pins 25 down, and at approximately 285° rotation, the feeler pin contacts 27*a*—27*b* open. At about 300° rotation of the cam shaft, a feed cam 37 operates a feed arm 39 which engages a tooth in a ratchet 41 on a feed shaft 43. This action rotates the feed shaft one position, placing the next set of code holes in line with the feeler pins. A detent 47 engages a detent ratchet 49, holding a tape feed sprocket 51 locked in position. The clutch magnet cam contacts 33 close at about 344° rotation of the cam shaft, but the energizing of the clutch magnet coil depends also upon other contacts in the circuit which will be explained later. The clutch magnet armature 11 engages the clutch lever which pulls the dog out of the drive ratchet, stopping the reader operation.

Figure 18A:
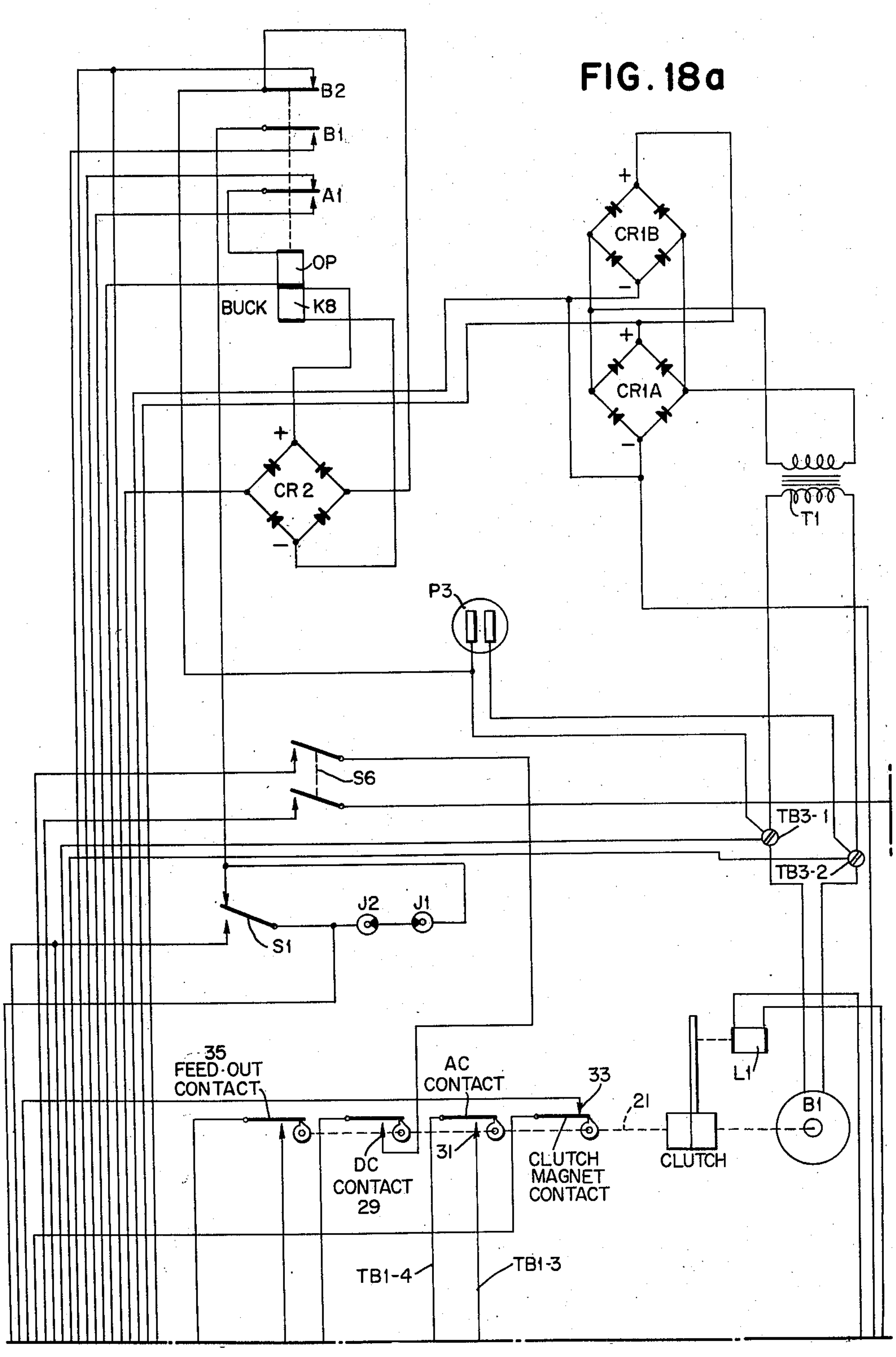
Figure 18B:
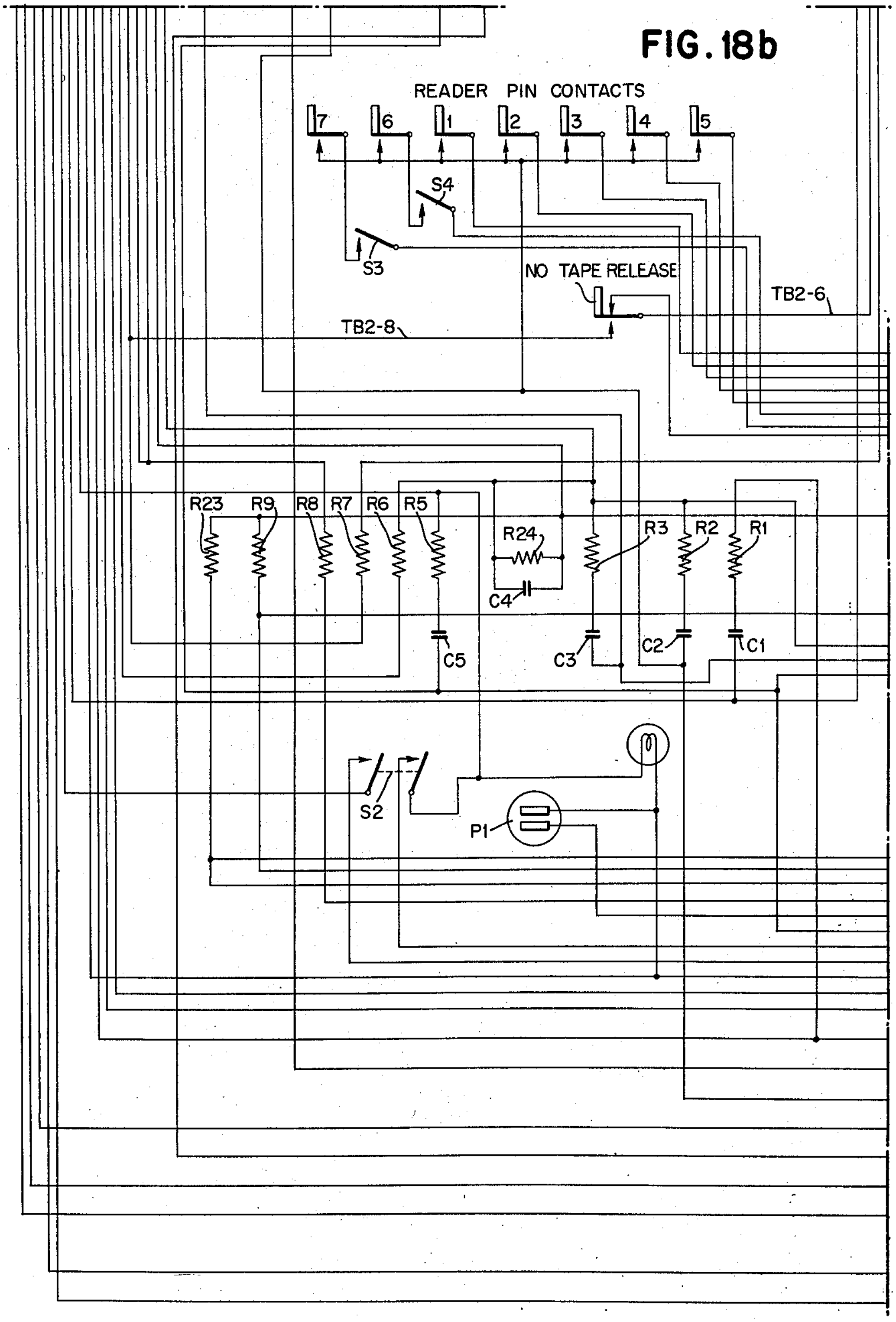
Figure 18C:
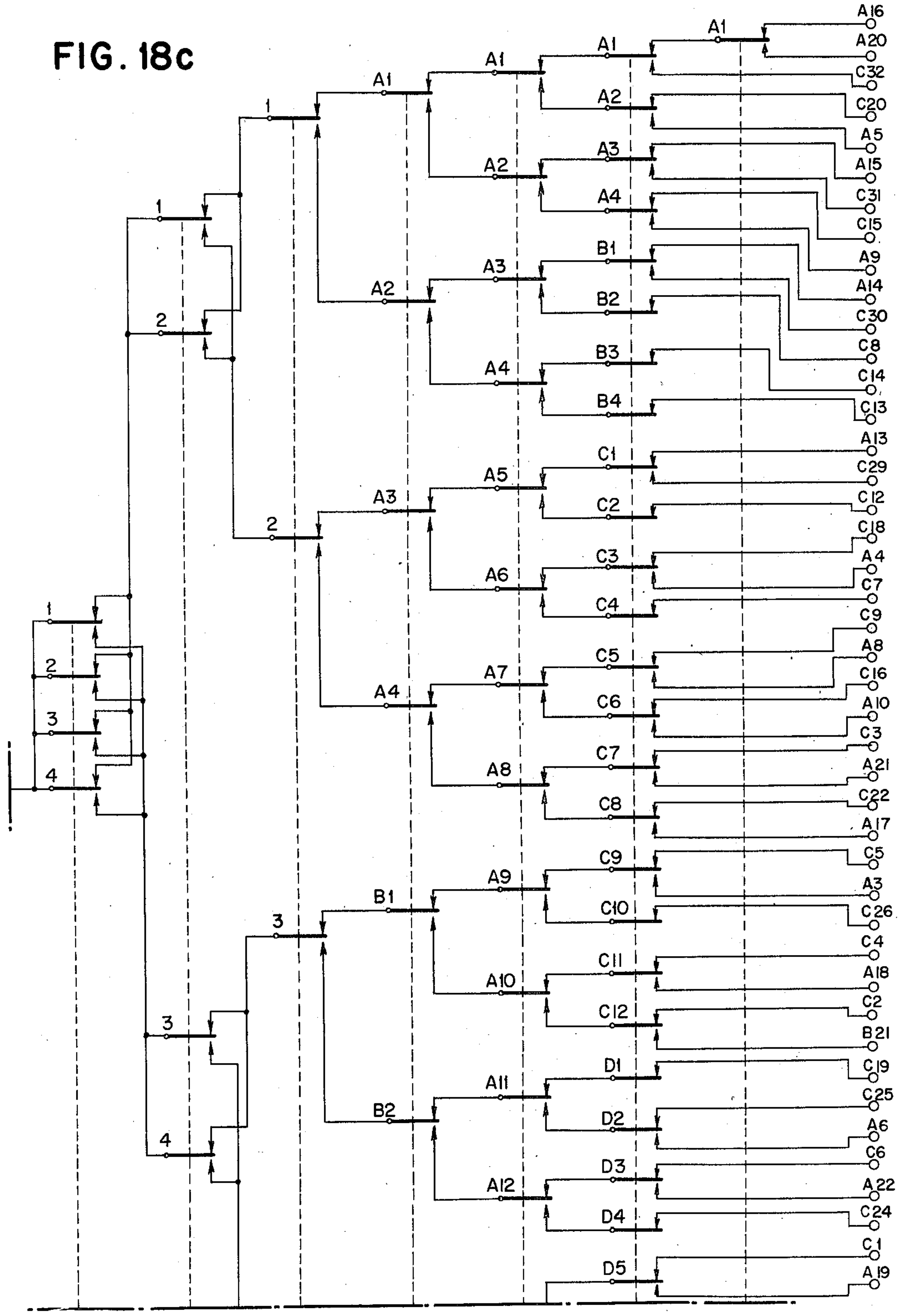
Figure 18D:
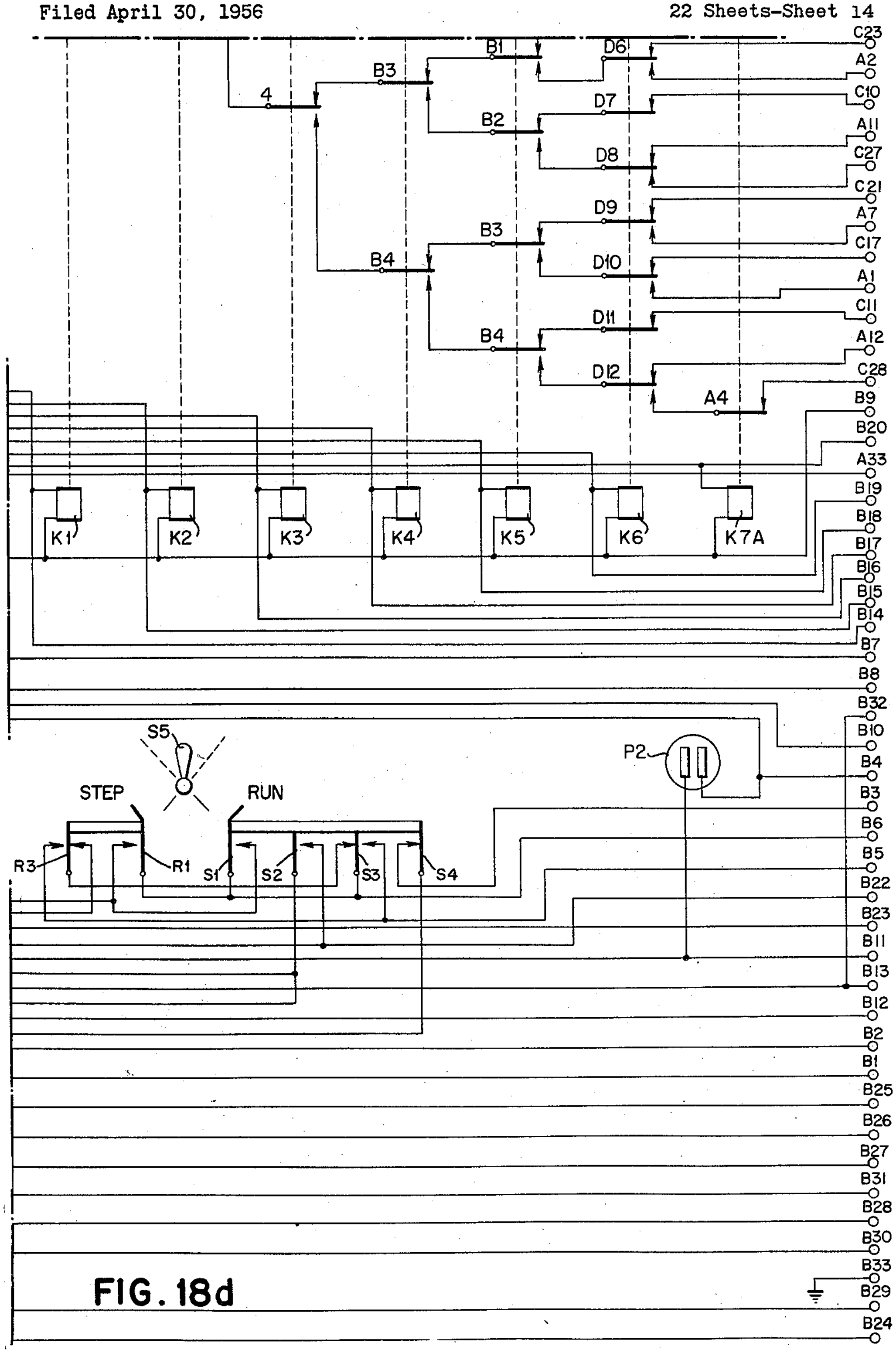

By reference to Figs. 18*b* it will be seen that power is applied to the reader circuit through a plug P1 which may be connected to a 115 volt, 60 cycle source of power. This applies power to the reader motor B1 (Fig. 18*a*) and to the primary coil of the reader transformer T1 (Fig. 18*a*). The step-down secondary voltage of the transformer is approximately 52 volts, and this is supplied to the reader rectifiers CR1A and CR1B. The power switch S2 (Fig. 18*b*) mounted on the control panel (Fig. 2) of the reader breaks one side of the alternating current line in the off position.

The power supplied to the rectifiers CR1A and CR1B by the transformer T1 results in an output of approximately 75 volts D. C. A positive D. C. voltage is on the D. C. common contact whenever the power switch S2 is closed. Also, when the reader run-step switch S5 (Figs. 2 and 18*d*) is in the neutral position and the no tape release contact (Fig. 18*b*) is closed, a direct current circuit will be completed to the operate coil of a delay control relay K8 (Fig. 18*a*).

When the reader run-step switch S5 is in the neutral position, and the no tape release switch is closed and the reader power switch S2 is closed, the following circuit is completed: from the positive direct current side of the reader rectifiers CR1A and CR1B to the cable terminals B6 and B8, to the S3 contact of the run-step switch S5 (Fig. 18*d*), from the run-step switch contact S3 to its R3 contact and from thence to cable terminals B7 and B3 through the run-step switch S5 contact S4, to the A1 contact of the delay control relay K8 (Fig. 8*a*), point TB2–6 (Fig. 18*b*) and the no tape release switch and point TB2–8 to the negative side of the D. C. circuit. This results in energizing the operating coil of the delay control relay K8 and the transfer of its A1 contact, completing a holding circuit as follows: from positive D. C. of the reader rectifiers CR1A and CR1B, resistor R6 (Fig. 18*b*), transferred A1 contact of the relay K8, and the no tape release switch to the negative direct current line.

In order to operate the reader it is necessary to energize the clutch magnet coil L1. With the reader run-step switch S5 in the run position and the no tape release contact closed, the following circuit is completed: from the positive direct current source of the reader rectifiers CR1A and CR1B to cable terminals B6 and B8, to the S3 contact of the run-step switch S5, to the R3 contact of the run-step switch S5, to cable terminals B1 and B5 and through the B1 contact of the delay control relay K8, through the clutch magnet switch S1 (Fig. 18*a*) in its normal position and from thence to the clutch magnet cam contact 33 and finally to the clutch magnet coil L1 and resistor R7, the no tape release switch and to the negative side of the direct current circuit. The clutch magnet coil L1 is thereby energized, attracting its armature and allowing the clutch shaft to rotate.

It has been stated that it is a purpose of this invention to provide means in the tape reader for stepping the tape a single data field at a time and reading that field without further feed of tape. The run-step switch S5 (Fig. 18*d*) when moved to its step position will result in the stated operation. When the run-step switch S5 is in the step position, the clutch magnet coil L1 is energized, starting a cycle of operation of the reader. At approximately 104° rotation of the reader clutch shaft 21, the A. C. common contact 31 closes, completing a circuit from the positive A. C. source through point TB1–3, the A. C. common contact, point TB1–4, the transferred point S2 of the run-step switch S5, a resistor R8, rectifier CR2 to the alternating current ground. The direct current output of the rectifier CR2 energizes a buck coil on the delay control relay K8. The flux of the buck coil opposes the flux of the operating coil, thus releasing the armature of the relay K8 and thereby breaking the B1 contact of the delay control relay K8. When the B1 contact of the relay K8 is opened, it breaks the clutch magnet circuit and thereby stops the reader. Therefore, due to the circuits described above, each step actuation of the reader run-step switch S5 will advance the tape one data field, but with the switch in the run position the tape will advance continuously.

An alternate control for stepping the tape of the reader from one data field to the next without continuous feeding and reading is shown in Fig. 19 wherein the run-step switch contains a condenser circuit which is directly connected to the L1 coil of the reader clutch magnet, and which permits a sufficient build-up of flux in the clutch magnet coil to operate the magnet for a single revolution. Fig. 19 is a diagrammatic drawing on which are shown the necessary circuits from the positive direct current source, and more particularly the switch contacts and electrolytic condenser of the run-step switch to the clutch magnet L1, and from there to the negative D. C. source. In this modification, the positive output of the rectifier is fed to a contact of the run-step switch, and from thence returning through the clutch magnet cam contact 33 to the clutch magnet coil and from the clutch magnet coil L1 to the negative side of the rectifier.

The run-step switch has a transfer point connected to the positive side of the circuit through a 24 microfarad electrolytic condenser C′. The time constant for charging the electrolytic condenser C′ is such that as current is fed through the clutch magnet coil to charge the condenser, sufficient magnetic flux is built up in the core of the clutch magnet L1 to operate the clutch magnet and cause it to hold long enough for the reader shaft to make one revolution and then stop. When the run-step switch is returned to its normal position, a resistor R′ associated in the condenser circuit will discharge the condenser C′ so that on the next operation of the switch to the step position the reading of one data field of the tape will result. This operation, i. e., the alternate movement of the run-step switch from normal to step, permits the tape in the reader to be stepped along a single data field at a time for the reading of code holes in the respective fields so stepped.

When the tape reader is connected to the typewriter through the cable connection the seven reader pin contacts (Fig. 18*b*) or any of them when closed will operate the relays K1 through K7 (Fig. 18*d*) which correspond respectively to the reader pin contacts 1 through 7. Thus, as stated, a translating network is set up through the respective relay points, whereby the combinational signals are translated to a single corresponding signal for operating the typewriter solenoids. In this regard it is to be noted that the tape reader may be connected directly to the tape punch through the B—D cable in such manner that the relay point translating network is by-passed and the combinational pulses produced by the reading of holes in the tape will operate directly on the code selector magnets in the punch. Each of the reader pin contacts has an electrical connection to its respective translating network relay which continues into the terminal of the B plug. Thus, the impulse produced by the respective reader pin contacts 1–7 are present also at the B cable terminals B14 through B20, respectively. When these respective terminals are connected to the terminals 1 through 7 of the D cable of the tape punch, a direct circuit is provided to the selector magnets L2 through L8 (Fig. 18*i*), respectively.

In connection with the transmission of data that is read from tape in the tape reader, it is to be noted that the reader is adapted for the reading of a 5, 6 or 7 position code. In order to accommodate the transmission system to the reading of three different codes, the reader circuit includes switches S3 and S4 (Fig. 18*b*). The switch S3 is in the circuit connecting the reader pin with its translating relay K7, while the switch S4 is in the circuit connecting the reader pin contact 6 with its respective translator relay K6. If, therefore, a seven position code is to be read in the reader, the switches S3 and S4 must be closed. If a six position code is to be read, the seventh level of translating points must be cut out by opening the switch S3. Furthermore, if a five position code is to be read, the sixth level of the translator points will be disabled by opening the switch S4 also.

Certain of the essential details of the typewriter construction are shown in Figs. 3 to 13, inclusive, and as stated previously, comprise elements of a well known commercial power driven typewriter. The structural features and principles of operation of this typewriter are disclosed in a number of U. S. patents, among which is Patent No. 1,777,055, granted September 30, 1930, which discloses the general principles of operation of the key levers and how they control, through related cam units, the operation of the type bars. In view of the detailed description of the construction and operation of parts given in the prior art, only a brief description will be given herein such that will be sufficient to enable the present invention to be understood.

Figure 3:
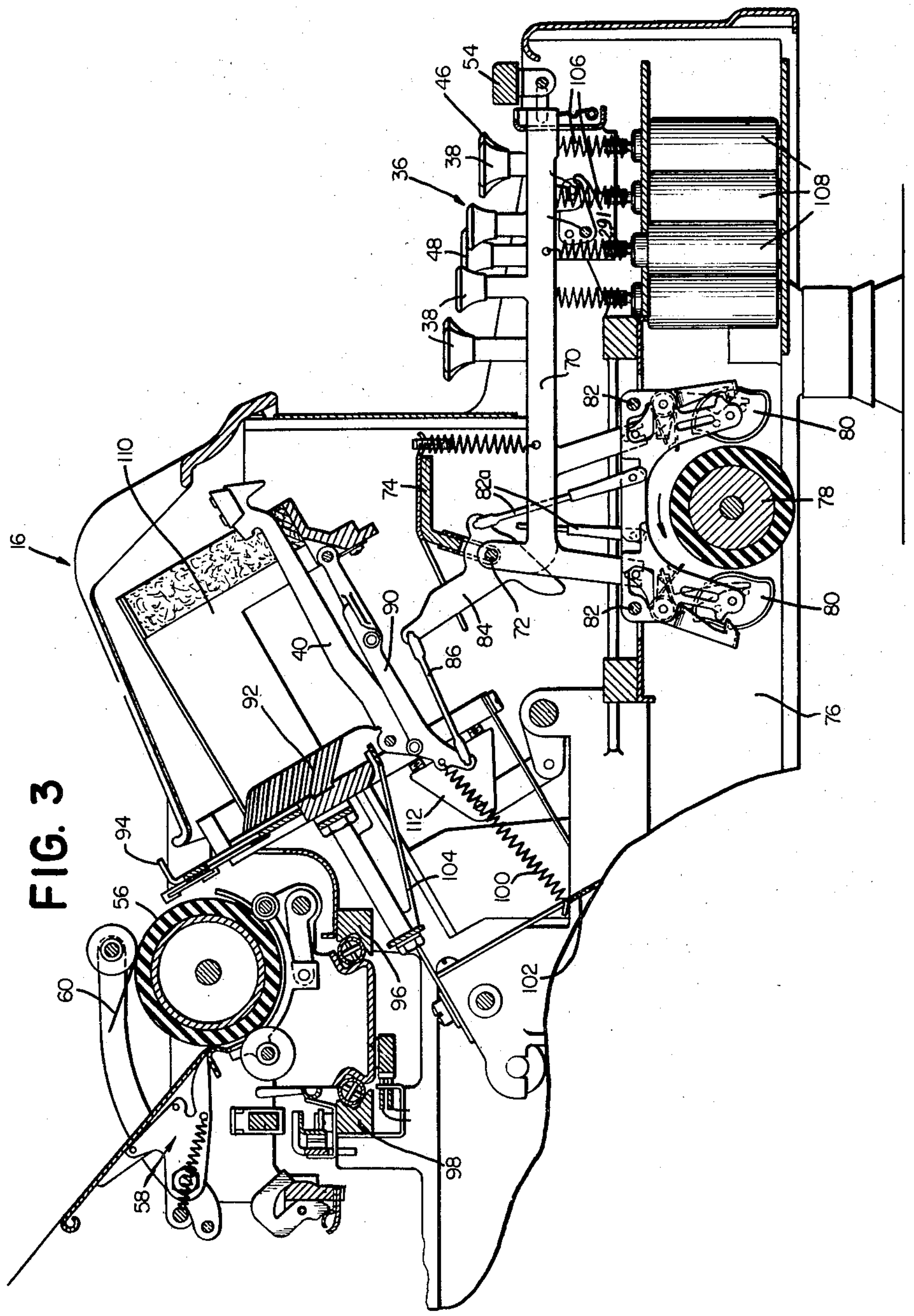
Fig. 3 is a vertical sectional view through an electrically controlled power operated typewriter.

As shown in Fig. 3, the character keys 38 are mounted respectively on key levers 70, the latter being pivoted on a rod 72 which is supported by a cross frame 74 rigidly mounted in the typewriter frame. Rotatably mounted in the typewriter base 76 is a power roller 78 which is rotated in the direction of the arrow by means of an alternating current motor, not shown in Fig. 3, but indicated diagrammatically in the circuit drawings. When the machine is in use, the power roller rotates continuously.

Cooperating with the power roller 78 are cam units 80 which are pivoted on rods 82 extending parallel in relation to the longitudinal axis of the power roller. A cam unit 80 is associated with each of the key levers 70, and each of the cam units which is operated by a character key 38 is connected by a link 82 with a sub-lever 84 pivoted on the rod 72. The sub-levers 84 are connected by links 86 to type bars 40 through the medium of toggles 90. The type bars 40 are pivoted in the usual type bar segment 92 and the latter is provided with a type guide 94 located in front of the platen 56. As previously stated, the platen is adapted to carry a copy sheet 60 and is rotatably mounted in the carriage 58, and the latter is supported for lengthwise movement on front and rear rails 96 and 98, respectively, by means of suitable anti-friction roller trucks. Springs 100 connected to a curved spring anchor 102 and to toggles 90 provide means for returning and maintaining the toggles in their normal or inactive position as shown in Fig. 3.

When any character key 38 is manually depressed, its related cam unit 80 is caused to engage the power roller 78 in a well known way, thereby rocking the cam unit 80 clockwise or counterclockwise, according to whether the particular cam unit is pivoted on the left or right rod 82, respectively, as viewed in Fig. 3. The rocking of the cam unit 80 causes its link 82 to be drawn downwardly, thereby rocking the corresponding sub-lever 84 in a clockwise direction. This movement of the sub-lever 84 through its associated link 86 and toggle 90 causes the type bar 40 associated with the selected key to rock in a counterclockwise direction to effect the impression of the type upon the copy sheet 60 wrapped around the platen 56. The type bar near the end of its operating stroke engages a universal bar 104 and causes it to move rearwardly and downwardly as viewed in Fig. 3 to space the carriage forward in manner not disclosed in detail herein, but which is well known to those skilled in the art.

Each of the character key levers 70 is connected by means of a spring 106 to an actuating solenoid 108 which, when energized, pulls its related key lever 70 downwardly to operate the related cam unit 80 and type bar 40 in the same manner as described above when the related key 38 is manually depressed. The solenoids 108 are those indicated by the reference numerals L10 through L61 in Figures 18*c* and 18*d* of the circuit diagram. As will appear more fully hereinafter, the solenoids 108 are selectively energized by the alternating current controlling circuits which are selectively established by the code translating relays K1–K7 (Fig. 18*d*) of the tape reading unit 14 and as more particularly shown in the aforesaid Patent No. 2,378,371.

Figure 18E:
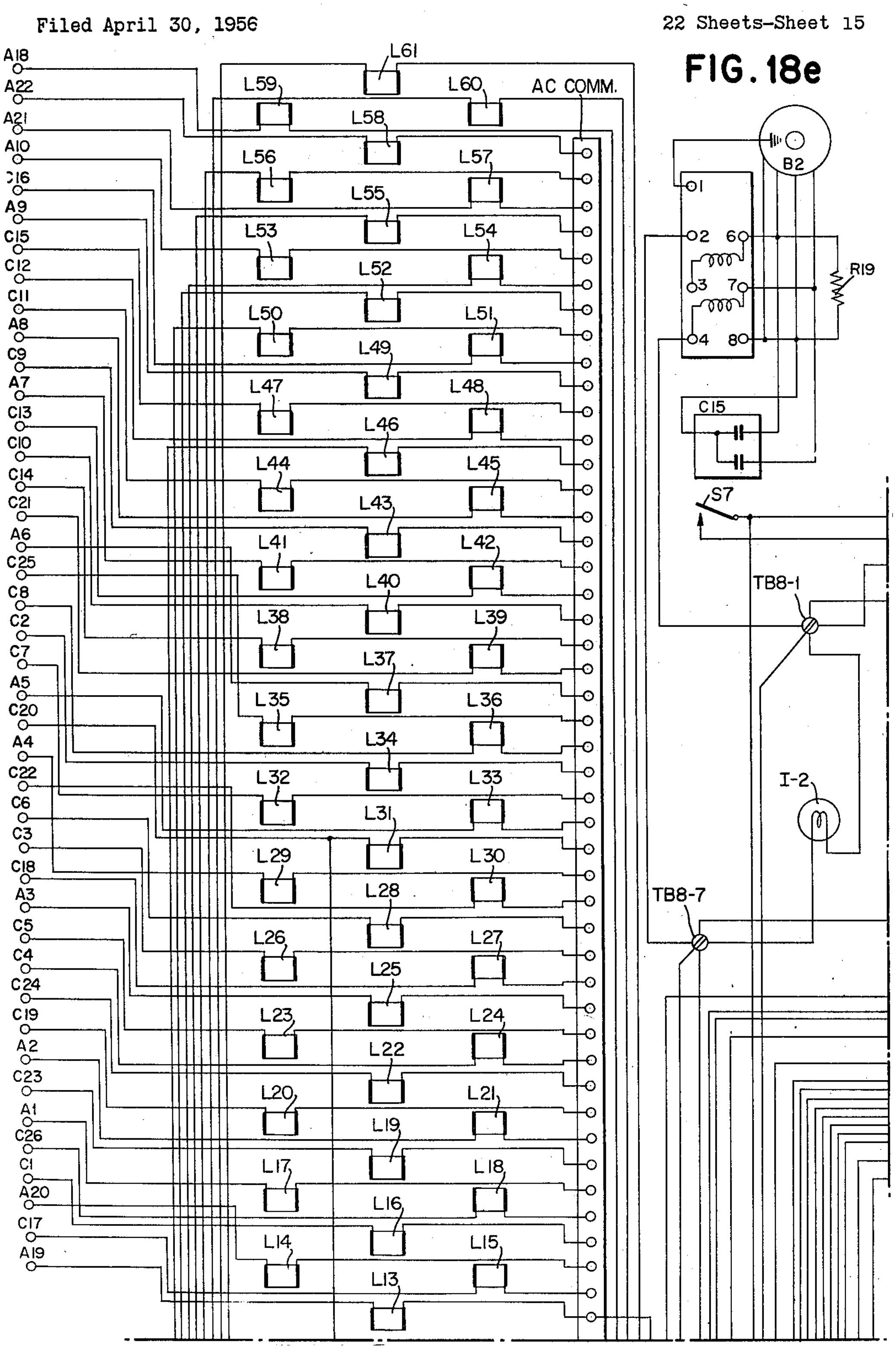
Figure 18F:
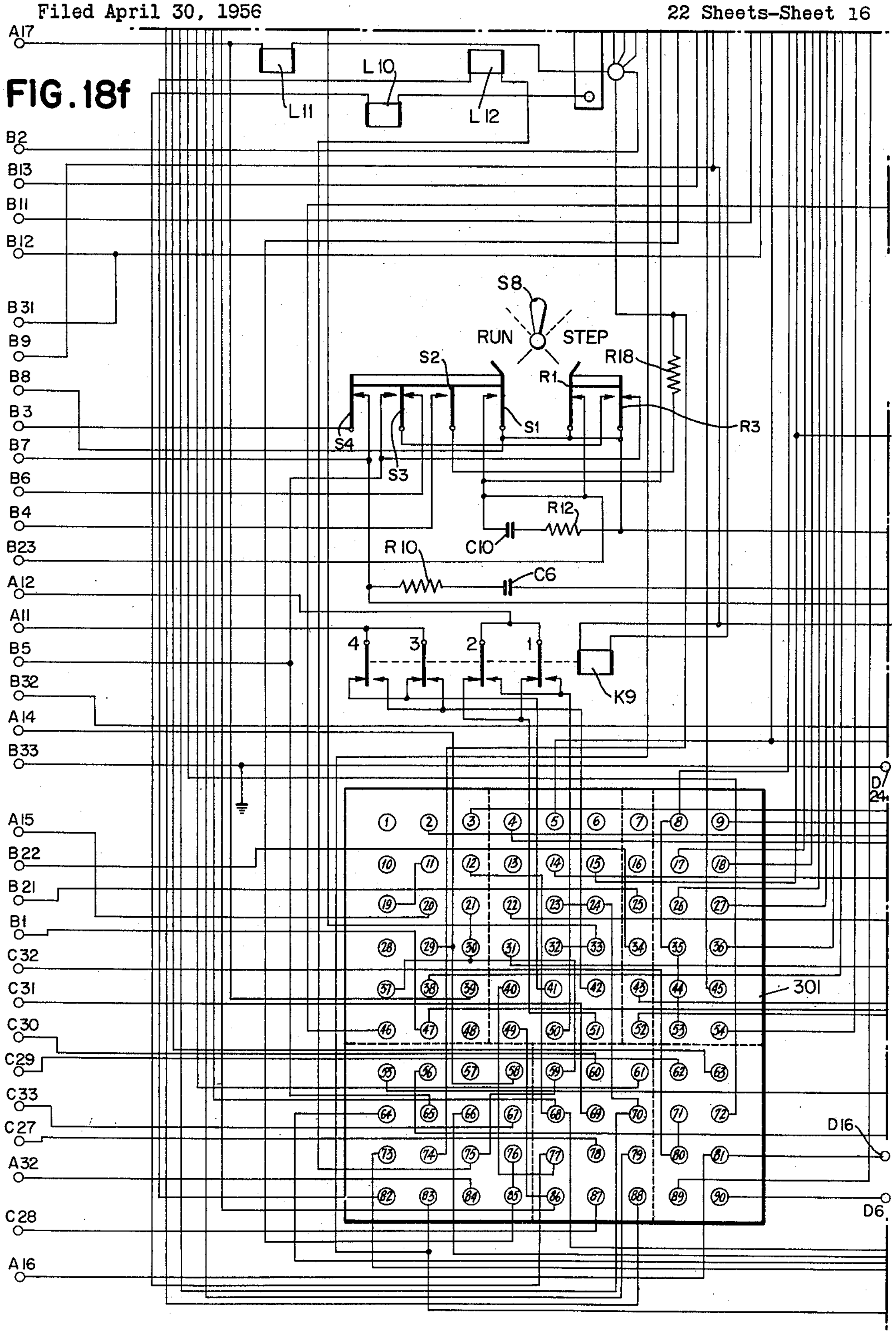

As understood by those skilled in the typewriter art, one of the cam units 80 is operated by manually depressing the space bar 54 and its related key lever, and such cam unit when operated effects the rearward movement of the universal bar 104 to space the carriage. The detailed mechanism for effecting this operation has not been shown herein, since it is well known to those familiar with the construction and operation of typewriters. One of the solenoids 108 is attached by means of the spring 106 to the key lever on which the space bar 54 is mounted. The latter solenoid is diagrammatically illustrated in the circuit diagram and identified therein by the reference numeral L12 (Fig. 18*f*).

Since the present invention concerns itself particularly with the case shift function, reference should be had to mechanism related thereto as shown in Figs. 6 and 7. The segment 92 is mounted in a frame 110 (Fig. 3) which forms part of the type basket. The type basket is movably mounted in the framework of the typewriter for case shifting movement wherein it normally occupies an elevated position shown in Figs. 3 and 6 for the typing of the lower case characters. The shift mechanism for drawing the type basket downwardly to permit the typing of upper case characters is described in greater detail in Patent No. 1,945,097, granted January 30, 1934, and is partly as shown in Fig. 6 of the drawings herein. Secured, respectively, to the back of the type basket frame 110 and on opposite sides thereof are two brackets 112. The brackets 112 are connected by links 114 to the outer ends of lever arms 116, the latter being fixed, respectively, on the ends of a transverse shaft 118 journaled in the framework of the typewriter. Pivoted on a stud 120 at one side of the typewriter is a lever 122 having two pins 124 and 126, engageable by the short arms of a T-shaped lever 128, the latter being pivoted on a stud 130 on one arm 132 of a three-armed lever 134. The lever 122 is connected by a link 136 to the outer portion of one of the lever arms 116, and at a point spaced from the connection of such arm and its link 114. The T-lever 128 has a stud **128*a* projecting into a slot formed in the key lever 138. One arm of the lever 134 is connected by a link 140 to a cam unit 142 which is controlled by the shift key lever 138 in substantially the same manner as the cam units 80 are controlled by the key levers 70**, described above.

The type basket is shifted downwardly into upper case position when the shift key 42 mounted on the key lever 138 is moved downwardly and it is returned to lower case position when the key is released and moves upwardly. It is, therefore, customary to hold the key lever 138 in its lower position while writing upper case characters. When the shift key lever 138 is depressed, the T-lever 128 is elevated to bring one of the short arms thereof to a position to the left of the pin 124, this movement taking place before cam unit 142 controlled by the key lever 138 is operatively connected to the power roller 78. When the cam unit 142 controlled by the shift lever is operated, the link 140 is drawn downwardly, thereby rocking the lever 134 in a clockwise direction. This draws the T-lever 128 to the right in Fig. 6 thereby, through the engagement of the T-lever with the pin 124, rocking the lever 122 in a clockwise direction. Consequently, through the link connection 136, the lever arms 116 connected thereto and the shaft 118 are rocked in a counterclockwise direction, thereby pulling downward the links 114, which results in the type basket being drawn downwardly into its upper case position.

As fully described in the aforesaid U. S. Patent No. 1,945,097, when the lever 138 is released so that it is returned upwardly to its normal position by a spring 144, the cam unit 142 is again actuated by the power roller so that the cam unit rocks in a counterclockwise direction as before. When the key lever 138 is released and before the cam unit 142 is actuated, the rear end of the lever 138 moves downwardly and thereby permits the T-lever 128 to move downwardly to bring the lower of its short arms into a position to the left of the lower pin 126. Consequently, when the cam unit 142 is rocked counterclockwise, as just stated, the cam unit through the link 140 rocks the lever 134 clockwise, and the latter through the T-lever 128 and pin 126 rocks the lever 122 counterclockwise. The lever 122, through the link 136, rocks the arms 116 and the shaft 118 clockwise to return, through the links 114, the type basket to the lower case position as illustrated in Figs. 3 and 6.

During the controlled operation of the typewriter by the sensing mechanism and the translator relays, the key lever 138 is pulled downward to shift the type basket to upper case position by the energization of the solenoid L10. The solenoid L10 has an armature 146 and a link **146*a* pivoted to a latching lever 148 which is, in turn, connected at its upper end to the key lever 138 by a stud 150 fixed within an opening in the key lever 138 and projecting into a slot 152 formed in the latching lever 148. As will presently appear, the key lever 138 is locked down when it is shifted by the solenoid L10, and the key lever 138 is released to return the type basket to its lower case position when a second solenoid L61 (Fig. 7) is energized. When the shift release solenoid L61 is energized, it pulls down a shift release lever 154 at the right of the typewriter. The solenoid L10 is energized as a result of the sensing of a shift code designation in the tape 10, which designation in the illustrative embodiment herein and as shown in Fig. 2 comprises holes in the 1, 2, 4 and 5 positions of a data field, and the solenoid L61** is energized as a result of the sensing of a release code in the data tape which function is represented by holes in the 1, 2, 3, 4 and 5 positions of a tape data field.

When the typewriter is operated manually, the shift key 42 is depressed and released to shift the type basket to upper and lower case positions. The manually operable shift lock key or button 44 cooperates with the key lever 138 and the latching lever 148 to lock the key lever 138 down in its upper case position when it is desired to type manually a substantial number of upper case characters. When the key lever 138 is locked down, it may be mutually released by depressing the shift release key 42 or 46.

The shift latching lever 148 is arranged at one side of the key lever 138 and the shift lock button 44 on the opposite side thereof. The stem of the shift lock button 44 is provided with a vertical slot (not shown) also receiving the stud 150 projecting from the key lever. A detent 158 is fixed to a stationary portion 160 of the typewriter frame and cooperates with the latching lever 148 in locking the key lever 138 down in shifted position. With the parts in their normal lower case position, as shown in Figs. 3 and 6, the detent 158 engages the lowermost inner surface of the lever 148. A tension spring 160 connects the latch lever 148 with the shift key lever 138 and serves to hold the lever 148 in this position, the stud 150 extending from the lever 138 occupying the lower part of the slot 152. The shift lock button 44 is provided with a pin 162 which extends over the latching lever 148 and engages the top of the latter. With the parts in normal lower case position, the lever 148 supports the button 44 through the pin 162, and the stud 150 also occupies the lower part of the slot in the stem of the button 44. The button 44 is also provided with spaced tabs 164 and 166, engaging, respectively, the upper and lower sides of the lever 138 which aid in holding the button 44 in an upright position.

When the solenoid L10 is energized, the latching lever 148 is pulled downward thereby until the top of the slot 152 engages the stud 150, and then the key lever 138 will also be pulled down to actuate the cam unit 142 to shift the type basket to upper case position. When the latter happens, the detent 158 will have cleared a ledge portion 168 on the lever 148 and the spring 160, in conjunction with the off-center pivotal connection between the armature 146, and the lever 148, will move the lever 148 to the right or counterclockwise as viewed in Fig. 6, until the ledge 168 is under the fixed detent 158, thus locking the latch lever 148 and the key lever 138 down in its shifted position.

When the button 44 is manually depressed, it also moves the latching lever 148 downward, through the pin 162, until the top of the slot 152 in the lever 148 engages the stud 150 on the key lever 138, and then the lever 138 will be moved downward with the lever 148 a distance sufficient to actuate the cam unit 142. When the latter occurs, the detent will have cleared the ledge portion 168 and the spring 160 will move the lever 148 counterclockwise until the ledge 168 is under the detent 158, thus manually locking the latch lever 148 and the key lever 138 down in shifted position.

As stated above, the key lever 138 is released to return to lower case position by energizing the solenoid L61 or by depressing the shift-release key 42 or 46. To this end, a bail rod 170 is provided which is mounted on a pair of triangular end plates 172 and 174 connected by the rod 170. The end plates are mounted for pivotal movement by studs 176 and 178 extending outwardly from the plates 172 and 174, and journaled, respectively, within opposite sides of the typewriter frame. A stud 180 extends inwardly from the end plate 174 and within a notch formed in a downwardly extending projection of the key lever 154 on which the key 46 is mounted. A second stud 182 extends inwardly from the end plate 172 and over the outer end 184 of the latching lever 148. Thus, when the lever 154 is moved down by the energizing of the solenoid L61 or by manually depressing either of the keys 42 and 46, the bail rod 170 is rocked with its pivotal support and the stud 182 engages the end 184 of the latching lever 148, and thereby rocks the latter downward and clockwise to move the ledge portion 168 out from under the detent 158 which unlatches the lever 148. When the lever 148 is thus released, the lever 138 is permitted to move up under the force of its spring 144 to the normal lower case position shown in Figs. 3 and 6.

Figs. 8 through 10 illustrate a modified form of latching and release mechanism for the case shift structure. In Fig. 8, the means by which the type basket is shifted from one position to another is identical to that shown in Fig. 6. Therefore, the same reference numerals have been applied to corresponding parts. The difference between the structure of Figs. 8 through 10 and that shown in Figs. 6 and 7 lies in the simplified and more reliable means by which the shift lever is latched into and released from the shifted position. This basically involves the structure of the shift latch and its release key.

As seen in Figs. 8 through 10, the shift lever 138 has pivoted thereto a shift lock and release lever 181. The shift lock and release lever is generally L-shaped and has a latching nose 183 at the short leg thereof adapted to engage under the latch 158 when the shift lever 138 is moved downwardly either by manual manipulation of the shift key 42 or by energization of the shift solenoid L10. The longer leg of the L-shaped shift lock and release lever extends generally parallel to the shift lever 138 and at its end has a shift release button 185. The pivotal connection between the shift lock and release lever 181 and the shift lever 138 is near the base of the shift lock and release structure and at a point to the rear of the shift key 42, this connection being by means of a pivot stud 187, which passes through the shift latch lever 182 and the shift lever 183.

As seen in Fig. 9, one end of the shift lock and release lever has a flange 189 which extends over the top edge of the shift lever 138 and thereby limits the downward movement of the shift lock and release lever in respect to the shift lever 138.

A notched projection 191 of the shift lock and release lever is adapted to engage the stud 182 extending inwardly from the triangular plate 172 which is journaled in the frame of the typewriter by the pivot stud 176. The plate 172 is adapted to rock about the pivot stud 176 with the bail rod 170 which is attached to a free corner of the triangular plate 172 and extends to the opposite side of the typewriter where it is supported in a corresponding corner of the triangular plate 174 which similarly is supported for rocking movement in the typewriter frame by the mounting stud 178. The bail rod 170 and its mounting structure is the same as that disclosed in reference to Figs. 6 and 7; therefore, the same reference numerals have been applied to corresponding parts.

As in the structure of Figs. 6 and 7, the shift release lever 154 has a downwardly projecting notched portion 155 which is engaged by the stud 180 extending inwardly from its triangular mounting plate 174. It will, therefore, be seen that when either the shift lock release key 185 or the shift release key 46 is depressed, the bail rod 170 will be rocked in a clockwise direction. When the shift key 42 is depressed, the shift lock and release lever 181, and particularly the nose 183 thereof, will be moved downwardly and also in a counterclockwise direction by reason of the fact that the notched projection 191 of the shift lock and release lever 181 is inhibited from free movement in a downward direction by reason of its contact with the stud 182 which, while mounted on a rockable structure, nevertheless affords a sufficient fulcrum about which the shift lock and release lever may pivot. Thus, during such movement, the nose 183 of the shift lock and release lever will be positioned under the edge of the latch 158 whenever the shift lever 138 is moved downwardly either by solenoid L10 or by manual manipulation of the shift key 42. When the nose 183 of the shift lock and release lever 181 is engaged under the latch 158, the free end of the shift lock and release lever 181 will be biased upwardly about its pivot 187, as shown in Fig. 10. It follows, therefore, that the shift lever 138 can be released by manually depressing the shift lock release key 185, so that it is urged about its pivot point 187 in a clockwise direction. This will serve to move the nose 183 of the shift lock and release lever out of contact with the end 158 of the latch, thereby permitting the shift lever 138 to return to its normal position.

By the same token, the shift lock and release lever 181 can be released by operation of the shift release lever 154, either under the influence of the shift release solenoid L61 or by manually depressing the shift release key 46. When the shift release lever 154 is moved downwardly, the notched portion 155 thereof will bear against the stud 180 thereby tending to rock the triangular plate structure 174 about its pivot stud 178. This will serve to move the bail rod 170 in a clockwise direction with the result that the motion is transmitted through the triangular plate 172 at the opposite side of the typewriter, whereby the inwardly extending stud 182 engaged in the notched portion 191 of the shift lock and release lever 181 will swing the shift lock and release lever about its pivot point 187 and the lock will thereby be released in a manner similar to the manual release by pressure on the key 185.

This invention concerns itself in part with the carriage return and line spacing function as controlled by operational codes in the record tape. Therefore, the mechanism for causing carriage return and line spacing will be shown and described herein to an extent to render intelligible to those skilled in the typewriter art the invention as applied thereto. Attention is directed to Patent No. 2,104,559, dated January 4, 1938 and Patent No. 1,753,450, dated April 8, 1930, for a full disclosure of the structural details of the carriage return mechanism shown herein, the latter granted patent being directed to the specific clutch shown herein for connecting the power roller to the drum about which the carriage return tape is wound.

Referring to Figs. 4 and 5, the carriage return key 48 is shown as mounted on a key lever 186 pivoted on the rod 72 and controlling the operation of a cam unit 188 which is similar in construction and operation to the cam units previously described, with the exception that it has an extension 188a adapted to support a contact operating cam roller 188b for operating a plurality of carriage return contacts, of which only CR contacts 7 and 9 are shown. A solenoid L60 is connected by a spring 190 to the key lever 186 and when energized moves the key lever downwardly to effect operation of the cam unit 188. The latter is connected by a link 192 with the inner or left end of a toggle lever 194 pivoted on a fixed stud 196 carried by a bracket 198 which is secured to a part 200 (see Fig. 5) of the frame of the typewriter. The outer or right end of the lever 194 is connected by a toggle link 202 (Fig. 5) to one arm of a two-part lever 204 pivoted on a pin 206 which is carried by the lower end of a bracket 208 fixed on the typewriter frame part 200. Another arm 210 of the two-part lever 204 is disposed adjacent a clutch 212. As described in Patent No. 2,104,559, when the lever 204 is rocked clockwise, as viewed in Fig. 5 herein, the clutch 212 (Fig. 4) connects the power roller 78 with a drum 214 about which one end of a carriage return tape 216 is wound. The other end of the tape 216 is connected to a part of the typewriter carriage 58 as more particularly shown in Figs. 8 and 9. The connection of the carriage return tape 216 is to the mechanism which controls the indexing of the platen 56 and the consequent line spacing of the copy sheet 60. This latter mechanism will be described in some greater detail at a point hereinafter.

When the cam unit 188 is operated by energizing the solenoid L60, as just stated, or by manual depression of the key 48, the lever 194 is rocked counterclockwise as viewed in Fig. 5, and the toggle formed by the right arm of the lever 194 and the link 202 is straightened and thereby effects the just mentioned clockwise movement of the two-part lever 204 to engage the clutch 212. The lever 194 is moved by the link 192 slightly past the dead center position of the toggle, and thus the lever 194 and the associated parts are held in their clutch engaging position. Upon engagement of the clutch 212, the carriage 58 will be returned, i. e., moved to the right as viewed in Fig. 4, to begin a new line of typing.

At the same time that the lever 194 is moved to engage the clutch in the manner just described, the inner or left end of the lever 194 engages and moves downwardly one arm 220 of a bell-crank 222 which is suitably pivoted by a pin 224 to a fixed part 226 of the typewriter frame. The bell-crank 222 will thus be moved about its pivot pin and a second arm 228 thereof, through a connecting link 230, will move a lever 232 pivotally mounted on a pin 234 clockwise about its pivot; and the lever 232 through a link 236 will move a lever 238 counterclockwise about its pivot. The lever 238 is pivoted on a pin 240 which is mounted on the rail 242. The lever 238 is formed with an arm 242 which when moved counterclockwise in the manner just stated will be positioned within the path of travel of the left hand marginal stop 244 of the typewriter. The stop 244 is mounted on margin rack 246 carried by the typewriter carriage and can be positioned thereon at any selected point corresponding to a letter space position of the carriage. Near the end of the return movement of the carriage and just before the marginal stop engages a fixed lug 248 formed on the tab lever, to stop the carriage, the marginal stop 244 engages the top surface of the arm 242 and thereby rocks the lever 238 clockwise. When the lever 238 is thus moved clockwise, motion is transmitted through the link 236, the lever 232, and the link 230 to rock the bell-crank 222 so as to move its arm 220 upward to engage the lever 194 and thereby move the latter clockwise to break the toggle and move the two-part lever 204 counterclockwise, which will effect disengagement of the drive disc of the clutch 212 and thereby release the tape drum 214 from driving engagement.

Details of the platen indexing mechanism which accomplish line spacing of the copy paper are shown in Figs. 11 and 12. The platen 56 is rotatably mounted on its axis 250 to which is attached at one end thereof a ratchet wheel 252 which is adapted to be engaged by a feed pawl 254 for rotating the platen. The feed pawl 254 is pivoted on a pin 256, the pin 256 being carried by a sliding supporting member 258. The supporting member 258 has a pair of spaced slots 260 and 262 which embrace fixed guide studs 264 and 266. A finger 268 is pivoted on the carriage frame at 270 and has its free end resting on the top edge of the feed pawl 254. The upper edge of the finger 268 has a series of notches 1, 2 and 3 representing line spaces, and when the operating lever 272, which is mounted on the pivot pin 264 is moved into one of the line space notches 1, 2 or 3, the free end of the finger 268 bears on the top of the feed pawl 254 and alters the relation of the feed pawl 254 in respect to the ratchet wheel 252 so as to cause the feed pawl 254 to engage either every tooth, every second tooth or every third tooth of the ratchet wheel 252 in accordance with the setting of the hand lever 272.

The lower edge of the support 258 has a laterally extending lug 274 which engages in the slotted free end of the operating lever 276. The operating lever 276 is pivoted on a fixed pivot stud 278 and is normally held in its raised position by means of a spring 280 (Fig. 12) which is wound about the pivot stud 278 and has one end thereof anchored to the carriage 58 and the other end to a stud 282 extending from one face of the operating lever 276.

The platen indexing mechanism thus far described is operated through an indexing movement when the carriage is returned under the force of the carriage return tape 216. The end of the carriage return tape is attached to a downwardly projecting T-shaped lever 284 which is pivoted on a pivot stud 286. The studs 278 and 286 are carried by a fixed, upstanding bracket 288 secured to the carriage 58. One arm of the T-shaped lever 284 has a bifurcation 290 in which is received a pin 292 extending laterally from a face of the lever 276.

It will appear from the foregoing, therefore, that when the carriage is returned under the influence of the carriage return tape 216, the T-shaped lever 284 will be rocked in a counterclockwise direction about its fixed pivot 286 with the result that the bifurcated end 290 of the lever will move downwardly, and as a consequence of the connection between the bifurcation of the lever and the pin 292, the lever 276 will also be rocked downwardly, thereby drawing the supporting member 258 downwardly to the point where the slots 260 and 262 will engage their upper extremities with the pins 264 and 266, respectively. Thereupon, in accordance with the setting of the control lever 272, the platen will be indexed 1, 2 or 3 line positions as the carriage is being returned. It may be remarked at this point that the indexing of the carriage is a movement that takes place as the carriage is being returned, i. e., the return of the carriage and the indexing of the platen are in effect a joint and related operation.

Emphasis is placed on the line spacing mechanism herein for the reason that there are certain typewriters and copy machines such as those used, for example, in the teletypewriter system of communication in which the carriage return operation and the platen indexing operation are completely separated from each other and dependent upon the receipt of distinct operational code signals for the initiation of their functions. The significance of this distinction can be realized when one considers the necessity for rendering compatible the present invention with the reading of record tapes in which distinct carriage return and line space indexing codes are present.

As explained hereinabove, in respect to the shifting of the type basket, part of the basket control mechanism is the shaft 118 particularly shown in Fig. 6 of the drawings which rocks through a partial revolution each time the basket is shifted from one position to another. Attached to the shaft 118 are three contact actuators 294, 296 and 298. These actuators operate, respectively, the upper case pulse contacts 300, lower case pulse contacts 302 and shift toggle contacts 304. The shift toggle contacts, as seen from the circuit diagram (Fig. 18*g*), are two in number, the shift toggle contact #2 being normally closed and the shift toggle contact #1 being normally open when the typewriter is operating in lower case. When the type basket is shifted to upper case for the writing of capital letters or special characters, these points are reversed and the shift toggle point #1 will then be closed while the shift toggle point #2 will be open.

The contact actuators 194, 196 and 198 are illustrated in Fig. 13. The relative position of these actuators within the typewriter is also shown in Fig. 6. By reference to Fig. 13, it will be seen that the upper case pulse contact actuator 294 and the lower case pulse contact actuator 296 are in the nature of toggle devices consisting of (as in the case of the actuator 294) a finger 295 to which is pivoted a second finger 297, the pivot point being at 299. The finger 297 has an inturned lip 301, which is adapted to engage the edge of the finger 295. This effectively prevents the rotation of the finger 297 about the pivot 299 in a clockwise direction beyond a line through the center of the shaft 118 and the pivot point 299. The lower case pulse contact actuator 296 is of identical construction but its mounting on the shaft 118 is in reverse.

With the toggle structure of the actuators 294 and 296 and their respective mountings, it will be seen that as the shaft 118 is rotated in a counterclockwise direction, the upper case pulse contact actuator 294 will extend, so that the contact 300 will be made (and immediately thereafter opened) as the actuator 294 is moved in contact with the yielding blade of the upper case pulse contact assembly. In its return movement, the actuator 297 will break at its pivot 299 and the upper case pulse contact will, therefore, be unaffected. By reason of the reverse mounting of the lower case pulse contact actuator 296, this actuator will close the lower case contact 302 during movement of the shaft 118 in a clockwise direction. By further reference to Fig. 13, it will be seen that the shift pulse contact actuator 298 is a simple lever mounted for rocking with the shaft 118 and that the shift pulse contact is a dual contact whereof either one or the other will be closed as the actuator 298 is rocked back and forth, i. e., the one contact of the shift pulse contact assembly will be closed as the shaft 118 is rocked in a counterclockwise direction, whereas the other will be closed when the shaft has been rocked to its limited position in the opposite direction.

Figs. 18*a*–18*i* when taken together as indicated in Fig. 13*a* constitute the wiring diagram of the system. Figs. 18*e*–18*h* when taken together comprise the wiring diagram of the typewriter circuits. At the left (Figs. 18*e* and 18*f*) are the conductor terminals which are connected to the tape reader by means of the three cables A, B and C. The conductors in cables A and C are those which are connected to the code translating network of the tape reader. In the wiring diagrams, corresponding reference numerals at pairs of cable terminals indicate that such pairs are electrically connected to each other. The conductors in cable B include the interlocking controls and power lines extending between the tape reader and the typewriter.

It will be noted that the conductors in cable A for the most part are connected to a bank of solenoids which are the same as the solenoids 108 of Fig. 3. In this bank of solenoids are not only those which, when operated, result in the actuation of a character type bar within the typewriter but also those necessary for the initiation of the usual typewriter functions. In this bank of solenoids is the shift solenoid L10 which when energized is effective to shift the type basket into upper case position as previously described, the solenoid L11 for controlling the tabulating operation with which this application is not particularly concerned, the solenoid L12 for effecting letter spacing, the solenoid L31 for controlling the type bar having a 5 in the upper case position and a T in the lower case position, the solenoid L52 which controls the type bar having the letters CR in the upper case position and the numeral $\overline{8}$ in the lower case position, the solenoid L59 which controls the back spacing operation, the solenoid L60 which controls the carriage return operation and the shift release solenoid L61 which when energized is effective to return the type basket to the lower case position.

As hereinbefore noted the control panel of the typewriter carries a set of interlocking control switches S8 and S9 which are the main switches for controlling the logical operation of the tape reader and typewriter. The switch S9 is directly related to the tape punch. The switch S8 is in series with the tape reader switch S5 and it is movable into one position wherein data fields of a tape may be read successively and into another position which controls the tape reader for the reading of a single data field for each manipulation of the switch, in a manner similar to that resulting from manipulation of the tape reader run-step switch S5. When either of the switches S5 and S8 is in the run position, it must be returned to the off position before either unit can be operated. The switch S11 controls the power supply to the circuits within the typewriter.

Figs. 18*e*–18*h* include the normal interlocking circuits operated by various mechanical typewriter elements. Of these the carriage return contacts, the shift contacts and the space contacts will be dealt with in this specification. Other interlocking controls such as the back space contacts, the tab contacts and the like do not enter into the essence of the invention and need not, therefore, be described. Fig. 13 of the drawings shows the shift toggle contacts, the upper case pulse contact and the lower case pulse contact which are also found in Fig. 18*g* (as to the shift contacts) and in Fig. 18*h* (as to the upper case and lower case pulse contacts).

It will be noted by examining the circuit of Fig. 18*f* that many of the electrical conductors are connected into a control panel or plugboard 301 in the typewriter (see also Fig. 1). The layout of this plugboard is shown in Fig. 17. Plugboards are conventional in the business machine art where they are used as a switching device for selectively routing signals through a control system. Fig. 18*f* shows the permanent internal interconnection between certain hubs of the plugboard. The switching connections are established by means of jumper wires between certain of the hubs, the ends of which wires are removably plugged into the respective hubs from the exterior of the plugboard. Since the present invention concerns itself with the interpretation of certain incoming signals which are received in a repetitive series (herein the shift signals which have been used by way of example), the plugboard forms an important element of the control circuit.

Within the typewriter are certain relays with related relay points which are necessary to an understanding of the invention. Relay K9 (Fig. 18*f*) is a shift control relay which has four transfer points, the circuits of which are operatively connected to certain of the hubs of the plugboard in the practice of the invention. Another relay which enters into the function of the invention is the function relay K12 (Fig. 18*h*), which is operative under certain conditions to suspend the tape reading operation in the tape reader when more than a minimum of time is required for the performance of a typewriter function such as carriage return, for example. The purpose of other relays such as the margin control relay K10 (Fig. 18*h*), the group space relay K11 (Fig. 18*h*), the line feed relay K15 (Fig. 18*g*), the tab relay and the shift relay K13 will be described hereinafter to the extent their function in this invention may require.

When the power supply is turned on, 110 v. A. C. appears on terminals B11 and B12 (Fig. 18*f*). This results in voltage on terminals TB8-1 and TB8-7 (Fig. 18*e*). The same 110 v. A. C. suitably transformed and rectified passes through terminals B8 and B9 (Fig. 18*f*) to provide 70 volts direct current for the solenoids and relays of the typewriter system. Upon closure of the switch S11 (Fig. 18*g*), power is supplied to the typewriter motor B2 (Fig. 18*e*), thus conditioning the typewriter to operate.

When a perforated tape is read in the tape reader, signals representing the characters read from tape will appear on the respective lines of cables A and C. As stated, the tape reader will read a character in coded form, translate the code so read and impress a signal on the proper input lines of cables A or C, so that appropriate solenoids in the typewriter are energized to actuate either a character key or a functional device. For example, when a 2-4-6 code, representative of a 4, is read from a tape, a signal will appear at terminal A4 which is connected to the solenoid L29 (Fig. 18*e*). This is the solenoid which is connected to the key lever connected with the type bar having thereon the numeral 4. The numeral 4 will, therefore, be typed upon the copy sheet in the typewriter. Subsequent signals will be received on the various A and C cable terminals for the typing of further characters until a word has been completed, at which time a 3 code will be read, indicating that a word spacing operation is to follow. The space signal is received on the terminal A14 (Fig. 18*f*) which is connected to plug hub 29. This hub is externally connected by means of a plug wire to the hub 30, and since the hubs 82 and 83 are also externally connected by plug wire, a circuit is completed to the space solenoid L12 and a letter spacing operation will result.

The typing of a line will proceed until the line is complete, at which time a carriage return code 4 is read from the tape for energizing the circuits which will result in the return of the carriage and the indexing of the platen. This circuit is as follows. The pulse resulting from the reading of a 4 code will appear on terminal A15 (Fig. 18f) which is connected to the plug hub 20. Plug hub 20 is plug wired to the hub 19 which, by reference to Fig. 18*f*, is externally wired to the hub 11. The hub 11 is externally wired to the hub 12 which in turn is internally wired to the hub 68. The circuit may now be traced from the plug hub 68 to the carriage return solenoid L60 (Fig. 18*e*) and from thence to the functional common terminal and the terminal B2 which is connected to the circuits of the tape reader, which will utilize voltage on line B2 to temporarily suspend reading of tape until the carriage return operation has been completed. At this time a signal will be received on line B1 (Fig. 18*f*) which is connected to plug hub 47. When the carriage return cam is operated, the carriage return contacts are transferred so that contacts 7 and 9 (Figs. 4 and 18*g*) are closed. When these contacts are closed, power will pass through the normally closed switch S12 (Fig. 18*g*), thereby energizing the function relay K12.

This results in the transfer of the A1 points of the relay K12 (Fig. 18*h*) to establish a circuit from the terminal B5 to the plug hub 65, which hub is externally plugged to the hub 64 and continuing through the now closed A1 point of the relay K12 and to terminal B7, where the voltage is used to restore the operation of the tape reader after it was delayed to permit the completion of the carriage return operation. When the tape reader continues to operate, power is again applied to terminal B1 which is connected to plug hub 47, bottle-plugged to hub 46 and to the now closed A1 terminal of the function relay K12, thus completing a circuit to the plug hub 64 which is plugged to the hub 65, which in turn is connected to the direct current source at terminal B5. The typewriter is now conditioned to write another line in accordance with the general sequence described above.

The punch, as stated, is adapted for operation either by direct connection to the reader or by connection to the typewriter and may be generally of the type shown in A. W. Mills, et al. Patent No. 2,346,267, granted April 11, 1944. Only so much of the punch, therefore, need be illustrated and described herein as will render the application of the present invention intelligible. The punch is designed to perforate a paper tape with a predetermined set of code holes transversely of the tape within successive data fields. A tape of this type is adapted for translation in the reader shown herein or for transcription by the typewriter.

When a character is typed on the typewriter, an electrical signal is generated within the typewriter by the closure of various combinations of permutation contacts.

The permutation unit may be of the type shown in Figs. 29 et seq. of E. O. Blodgett Patent No. 2,700,447, granted January 25, 1955. When a key lever is operated in the typewriter it will result in the closure of one or more of the permutation contacts shown in Figs. 12 et seq. and these contacts are connected through the D cable terminals to the selector magnets L2-L8 of the punch in Fig. 18*i*. These magnets, as previously stated, may also be directly connected through the B—D cable to the reader whereby a tape being read in the reader can be duplicated in the punch. The selector magnets of the punch when energized will release corresponding latch levers which engage one end of the punch actuating levers. The actuating levers are mounted on an eccentric shaft. The particular actuating levers selected by incoming signals are held at one end by the latch levers. Therefore, when the eccentric shaft starts to rotate, the opposite ends of the actuating levers force the punch pins toward the tape. The punch pins will perforate the tape after a required degree of rotation of the eccentric shaft, whereafter the tape will be fed one position to prepare it for the next punching cycle.

Fig. 16 is a somewhat fragmentary perspective representation of the punch mechanism which is sufficient to explain its fundamental features. The electrical signals from the punch control permutation unit contacts of the typewriter or direct from the tape reader energize the corresponding coils of the selector magnets L2-L8 (see also Fig. 18*i*). When a selector magnet coil such as L2 (Fig. 16) is energized, the selector magnet armature 311 is attracted, thereby releasing the latch lever 313. The latch lever operates the lower clutch magnet contact bail 4 which operates the lower clutch contact 317. The latch lever also engages one end of the punch actuating lever 319.

The lower clutch contact 317 completes the circuit to the clutch magnet coil L9 through the upper clutch contacts 321 which are normally closed when the clutch 323 is latched. The clutch magnet coil L9 is energized attracting the clutch magnet armature 325 which releases the clutch lever and allows the clutch dog to engage a ratchet tooth of the continuous running shaft 327. The ratchet shaft rotates the clutch shaft 329 and through two spiral gears rotates the vertical eccentric shaft 331. The eccentric portion of this shaft is engaged by the punch actuating levers. When properly timed, the high point of the eccentric portion is toward the drive pulley when the clutch is latched.

As the eccentric shaft starts to turn, the latch lock arm 333 drops into a recess in its cam 335, which is one of five cams in a cam group mounted on the eccentric shaft. When the latch lock arm 333 drops into the recess of its cam 335, it moves the latch lock bail 337 to such position that the bail locks the selected latch lever into engagement with the punch actuating levers, and the unselected latch levers out of engagement with the punch actuating levers. The actuating levers not selected are held back by a spring at the punch pin end, causing the opposite end (which is free) to swing out. The selected actuating levers are mechanically held by the latch levers 313, causing the punch pin end 319 of the levers to swing out, moving their respective code punch pins 339 toward the punch die block. As the eccentric shaft 331 continues to turn, the upper clutch magnet contact 321 is opened by the cam 341 on the clutch shaft, which deenergizes the clutch magnet coil L9.

The punch actuating lever 319 and code punch pins 339 that have been selected continue to move out through the first half of the cycle until the code punch pins have been driven through the tape and die block. In the next half cycle the punch pins start to return to their normal position; also, the latch lock bail 333 unlocks the selected latches 313. By action of cam 343, the latch reset cam arm 345 moves the latch reset bail 347 which in turn starts to move the latch levers 313 out of engagement with the actuating levers 319. When the latch levers 313 start to reset, the lower clutch magnet contact bail 315 moves so as to open the lower clutch magnet contacts 317. As the latches are restoring, the armature knock-off cam arm 349 starts to operate the armature knock-off bails 351 and 353. After a certain degree of movement of the latch reset bail 347, the latch levers are moved approximately $\frac{1}{32}$ of an inch beyond the notch on the armature. The armature knock-off bails 351 and 353 then move out and drive the armatures away from the selector magnet cores and against the tip of the latches, so that they are in locked position. While these armatures are moving away from the cores, the latches are stationary due to a dwell period on their reset cam.

The punch pins are now out of the perforated holes in the tape, and at this time the feed cam 355 starts to move the feed arm 357 which engages the feed pawl 359 by means of a stud mounted on the feed arm. The feed pawl engages a tooth in the feed ratchet 361 and starts to move the feed shaft 363 and the tape one position. The latch reset bail 347 again moves, allowing the latch levers to engage the notch in the armatures. When the latches are engaged, the armature knock-off bails 351 and 353 start to return to their normal position.

The reset bail 347 continues to move away from the latches and the feed pawl continues feeding the tape. The knock-off bails come to rest, then the reset bail returns to its normal position and the feed pawl has moved the feed ratchet and tape one position. The detent rollers 365 settle into the teeth on the detent ratchet, thereby holding the feed ratchet in position. The upper clutch contacts 321 close and the feed arm 357 returns, carrying the feed pawl 359 back to normal position. The clutch magnet armature L9 engages the clutch lever 323, pulling the clutch dog away from the drive ratch, thus latching the clutch and completing one cycle of the punch. It may be noted that the latch lever in the feed punch pin position has no armature and is always engaged with the feed punch actuating lever. The feed punch pin and the feed punch actuating lever are driven out each time the eccentric shaft rotates, in order to punch feed holes along the center line of the tape. The anti-repeat contacts 367 are operated by the cam 369.

Fig. 181 is the control circuit for the punch and by reference to this figure, it may be seen that the alternating current source for the punch is a terminal plug P4 which may be connected to a suitable 115 volt, 60 cycle line. The terminal plug P4 is connected to the punch motor B3 and to the primary coil of the punch transformer T2. The step-down secondary voltage of the transformer is approximately 32 volts and this is supplied to the punch rectifier CR3. The power switch S14 mounted on the control panel of the punch breaks one side of the alternating current circuit in its off position and also breaks the negative side of the direct current circuit.

The direct current supply is furnished at the output of the punch rectifier CR3. This D. C. output voltage is approximately 75 volts at no load and approximately 60 volts at full load. A .25 microfarad condenser C16 is used across the D. C. output to smooth the D. C. voltage. A 25,000 ohm resistor R22 is placed across a .25 microfarad condenser C17 to bleed it after the power is turned off.

The clutch magnet circuit is the main electrical operating circuit in the punch. It controls the operation of the punch by energizing the clutch magnet coil L9. There are two sets of contacts connected in series on this coil. One is the lower clutch magnet contact 317 (normally open) which is operated by the lower clutch magnet contact operating bail 315 (Fig. 16). The other is the upper clutch magnet contact 321 (normally closed) which is operated by a cam on the clutch shaft. One side of the lower clutch contact is connected to the positive side of the rectifier. When the lower contact 317 is closed by the operating bail, a circuit is completed from the positive side of the rectifier CR3 to the lower clutch contact 317, through the switch S13 to the upper clutch contact 321 and from thence to terminals D23 and D22 which may be connected to the typewriter where the circuit extends through the points TB12–2, the coil L9, the points TB12–1, switch S14 and through the terminal D9 to the minus side of the rectifier. The clutch magnet coil is thereby energized starting a cycle of punching operation.

The selector magnets L2–L8, as stated, when energized either singly or in combination operate a corresponding punch pin. When one or more permutation contacts in the typewriter are closed, the corresponding selector magnet is energized in the punch. For example, if the #9 key lever of the typewriter is operated, the permutation contact #1 and the common contact of the permutation unit will be closed, thereby closing the circuit to the punch selector magnet L2. It may be noted that the switch S11 of the typewriter must be in its home position to operate the selector magnet circuits.

The 115 volt, 60 cycle circuit of the tape reader is connected to the typewriter motor through the B cable. The A. C. circuit is controlled by either of the power switches S2 and S11, one located at the left side of the typewriter and the other located on the reader control panel. The D. C. circuit of the typewriter is powered from the rectifier in the reader.

In the operation of the typewriter there are certain functions which require more time to operate than that required for the typing of characters. In order to provide such additional time, it is necessary to stop the reader until the function within the typewriter is completed. The common return from the solenoid coils which control these functions requiring more time for their completion is connected in series with the buck coil on the delay control relay K8 (Fig. 18*a*) in the tape reader, heretofore referred to. When one of the functional solenoids is energized, and as a result thereof the buck coil is energized, the delay control relay K8 is bucked out, thus opening the clutch magnet circuit, as stated in respect to the description of the tape reader circuits.

When the solenoids controlling the functions of tabulating, back spacing, shifting, or carriage return are energized, the key levers connected to these solenoids trip the cam controlling the respective operation. When this happens, a normally open contact related to the operation is mechanically closed, and in so closing, completes a circuit to the function relay K12 (Fig. 18*h*) in the typewriter. The function relay K12 becomes energized, closing its A1 transfer contact and opening the normally closed A1 contact. When the A1 transfer contact of the function control solenoid K12 is closed, a D. C. circuit is completed to the operate coil of the delay control relay K8 (Fig. 18*a*), thus energizing this relay. When the normally closed A1 contact of the function control relay K12 opens, the D. C. circuit to the clutch magnet coil L1 (Fig. 18*a*) in the reader is broken. From the foregoing it can be seen that whenever a function is initiated in the typewriter by a solenoid which is connected to the functional common, the tape reader will stop. During the operation, a contact operated during the performance of that particular function will close in order to energize the function relay K12 (Fig. 18*h*); this, in turn, picks up the delay control relay K8 in the reader, but the reader does not start because the clutch magnet circuit is broken by the opening of the normal A1 contact of the function relay K12. When the operation is complete, then the mechanically operated contact is allowed to open, thus breaking the circuit to the function relay K12, whereby the circuit to the clutch magnet coil L1 is again completed to allow the reader to operate.

The invention concerns itself particularly with certain of the functions which are performed when a carriage return signal, a shift signal or a line space signal is received. As stated, in connection with an explanation of Figs. 8 and 9, the typewriter herein employed is of such mechanical structure that return movement of the carriage return tape 216 results in both the indexing of the platen and the return of the carriage to its left marginal position. Certain communication equipment such as the teletype systems employ writers in which separate line spacing and carriage return functions are employed and for which separate signals are required. It is intended that the system herein described be operable under control of teletypewriter tape, for example, and be adapted to produce a punched control tape which is operable in teletypewriter equipment. Therefore, there has been provided herein a special control system for the performance of the carriage return and line spacing function.

To permit operation of the carriage return function and the perforation of a —4— code in the tape punch, the plugboard hub 19 (Fig. 18*f*) should be wired to hub 20, the hub 11 should be wired to hub 12 and the hub 17 should be wired to hub 18. The routing of the carriage return signal may be altered to eliminate the carriage return signal completely, to eliminate the carriage return function or to operate the carriage return function but to eliminate the punching of the —4— code. To eliminate the carriage return signal completely, the plug wires which connect the plugboard hubs 11 and 12 are removed and the hubs 10 and 11 are wired to each other. To eliminate the carriage return function but to use the incoming —4— code signal to operate the space solenoid, it is necessary to remove the plugging between hubs 19 and 20 and to wire plug hub 20 to hub 21. To operate the carriage return function but to eliminate the regenerated —4— signal to the punch, it is necessary to remove the plug connection between plug hubs 14 and 18 and to wire plug hub 16 to 17.

The regenerated functional signals which are ordinarily transmitted to the punch may be eliminated or altered. For example, to eliminate the carriage return code —4— from a regenerated tape, it is necessary to plug the plug hub 16 to 17, and to cause the punching of the carriage return code —4— it is necessary to plug the plug hub 17 to the hub 18. In similar fashion, in order to operate the line feed code circuit for punching a line feed code —2— in a tape, it is necessary to plug hub 26 to hub 27, but to eliminate the punching of the line feed code the wires connecting these hubs will be removed. If it is desired to perform a carriage return operation upon receipt of the CR (carriage return) character signal, this may be achieved by connecting plug hub 68 to hub 69. If the character CR is to be typed, a plug hub connection is made between hubs 69 and 70. In like manner, to type the character LF (line feed) as a result of the sensing of the 2–6 code, it is necessary to connect plug hub 62 to hub 63. The line feed signal can be entirely disregarded by removing the connection between the plug hubs 62 and 63. In this regard it will be remembered that the line feed signal performs no function in the typewriter herein, since the line feeding operation is a direct result of the carriage return function.

With the foregoing in mind the carriage return circuit and the line feed circuit to the punch can be conditioned to energize the selector magnets for punching a carriage return code —4— followed by a line feed code —2— in the punch, whether or not such signals are read from the record being sensed in the reader, and despite the fact that no separate line feed function is performed in the typewriter.

The selector magnet L5 in the punch when enegized punches a —4— hole carriage return signal into the tape being regenerated. This is accomplished by the use of contacts operated by the carriage return selector bar on the permutation unit which when operated will short together the carriage return contact straps 5, 3 and 1, thereby completing a circuit from the positive direct current typewriter switch S11 through plug terminal D19, to the closed B1 point of the relay K18 (Fig. 18*i*) in the tape punch, through the plug terminal D15 to plug hub 17, to bottle plugged hub 18, through point TB4—24, to the carriage return contact point 5, and through the now closed carriage return contacts 3 and 1 and from the carriage return contact 1, and from thence through cable terminal D4 to the selector magnet L5 and to the minus side of the D. C. circuit. The #4 selector magnet L5 is energized through this circuit, causing the punching operation to start. When the carriage return contacts were operated by the selector bar, the contact straps 2, 4 and 6 were also shorted together. Therefore, at approximately 180° rotation of the punch clutch shaft, an anti-repeat contact circuit is completed as follows: from the positive D. C. supply through the typewriter switch S11, to the carriage return contact point 6, from the carriage return contact point 6 to the now closed carriage return contact point 2, and via the plug terminal D18 to the anti-repeat cam contact 367 and to the coil of the relay K18, and from thence to the minus side of the D. C. line. The anti-repeat relay K18 is energized, and when so conditioned it transfers its A1 and B1 contacts. When the common and transfer A1 contact points close, a holding circuit is completed to the anti-repeat relay K18. When the common points B1 of the anti-repeat relay K18 open, the positive D. C. circuit is broken to the #4 selector magnet L5, thus preventing a repeated punching of the —4— code in the tape.

As previously stated, the purpose of the line feed circuit in the typewriter and punch is to punch a line feed code —2— into a tape immediately following every carriage return code —4—. In order to accomplish this function, a set of normally open and normally closed contacts in the carriage return contact assembly (Fig. 18*g*) are utilized. When the carriage return contact assembly is operated as previously described, the contact 6 is closed with the cotact 4 and the previous contact between the contact 6 and the contact 8 is broken. When contacts 4 and 6 are closed, a circuit is completed from the positive D. C. line through the typewriter switch S11 to the carriage return contact point 6 and from thence to the carriage return contact point 4 with which point 6 is now closed, and to the line feed relay coil K15, and from thence to the minus side of the D. C. line. This circuit results in the energization of the line feed relay K15 and the transfer of its A1 contact. When the carriage return contacts return to normal at the end of the carriage return operation, the carriage return contact 6 is closed with the carriage return contact 8, and the contact between the carriage return contacts 4 and 6 is broken. Therefore, the circuit to the line feed relay K15 is broken. Due to the slow drop-out characteristic of the line feed relay K15, its contact A1 will remain transferred long enough to complete the following circuit: from the positive D. C. through the typewriter switch S11, the carriage return contact 6 which is now in contact with the carriage return contact 8, from the carriage return contact 8 and to the transferred A1 contact of the line feed relay K15 and back to plug hub 26, thence to bottle-plugged hub 27 to cable terminal D2 and selector magnet L3, and from thence to the minus side of the line. The selector magnet L3 is energized with the result that a —2— code is punched into the tape. It may be noted that the carriage return code —4— is perforated in the tape when carriage return contacts 1, 3 and 5 are shorted together, and the punch will then complete one cycle before the line feed code —2— is perforated as described above.

As specifically described in connection with Figs. 6 and 7 of the drawings the typewriter has two shift key levers, each with an associated unique code combination and operating solenoid. When the upper case code is read, it energizes the left shift solenoid L10 causing operation of the left shift key lever and effecting the shifting of the type basket to the upper case position. When the upper case position of the type basket is achieved, the key lever and type basket are locked in this position. Since no time delay is required for this particular operation, the left shift solenoid is not connected to the functional common. When the shift release code is read, it energizes the right shift solenoid L61 and depresses the right shift lever to release the shift lock and effects the shifting of the type basket to the lower case position. Since this operation requires sufficient time to perforate the 3 hole in the tape, the right shift solenoid L61 is connected to the functional common. When the shift cam is tripped, the cam roller arm operates the shift contacts. When the shift contacts 1 and 3 are closed, they complete a circuit to the function relay K12. This results in the same operation as previously explained in connection with the function delay relay. The delay control relay K8 in the reader is picked up but the clutch magnet circuit is broken until the shift contacts 1 and 3 open, i. e., when the shift cam returns to its normal position.

Figure 18G:
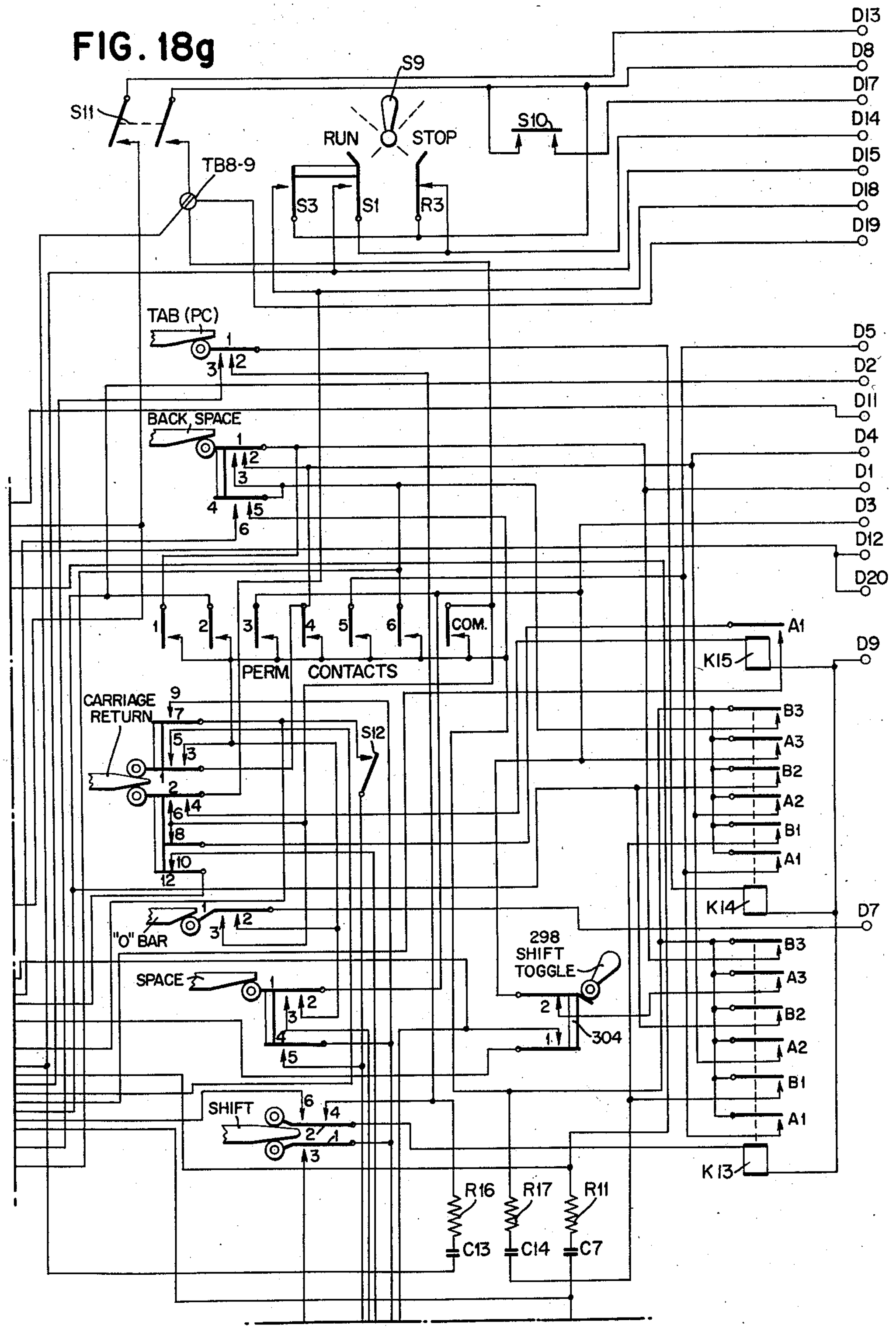
Figure 18H:
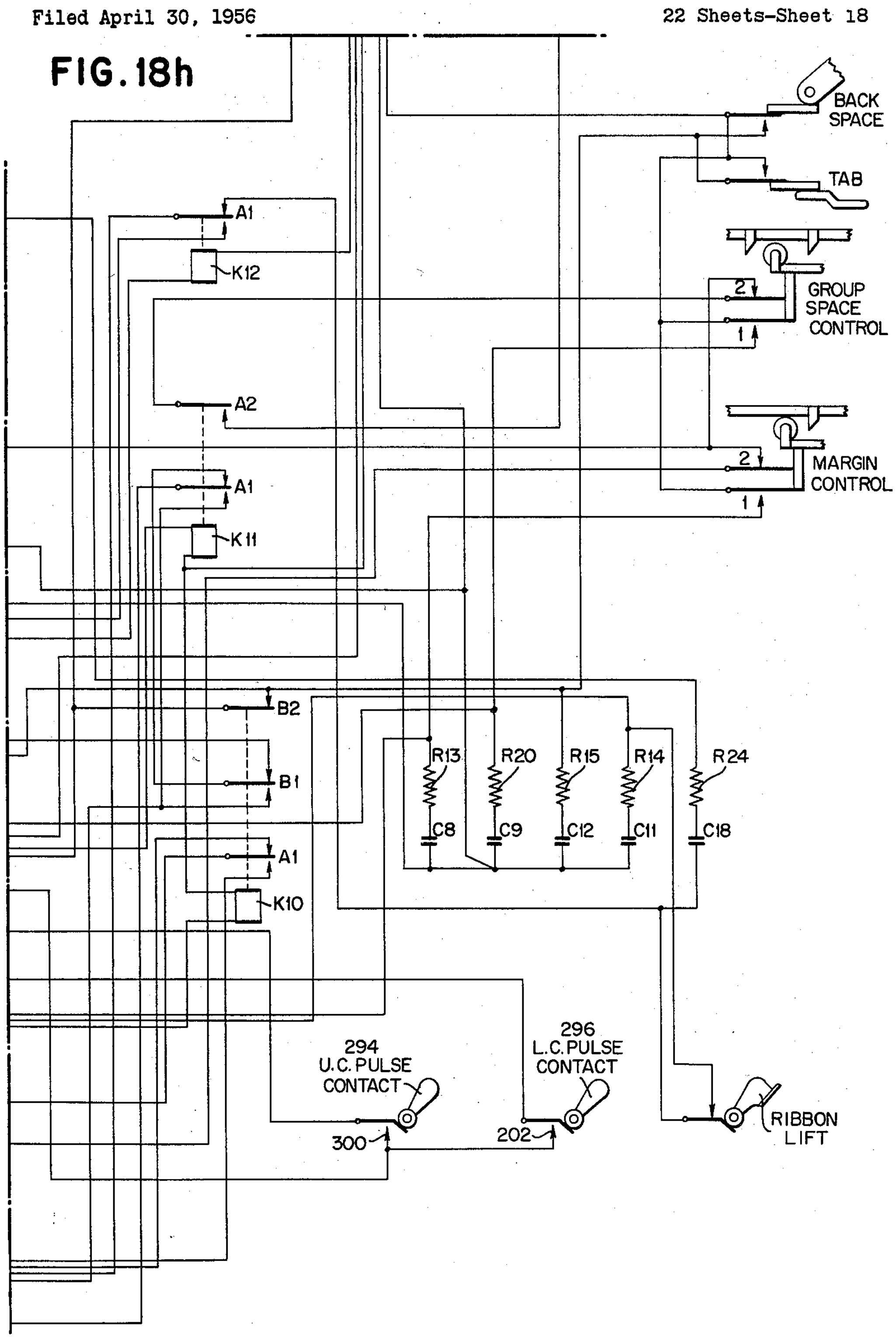
Figure 18I:
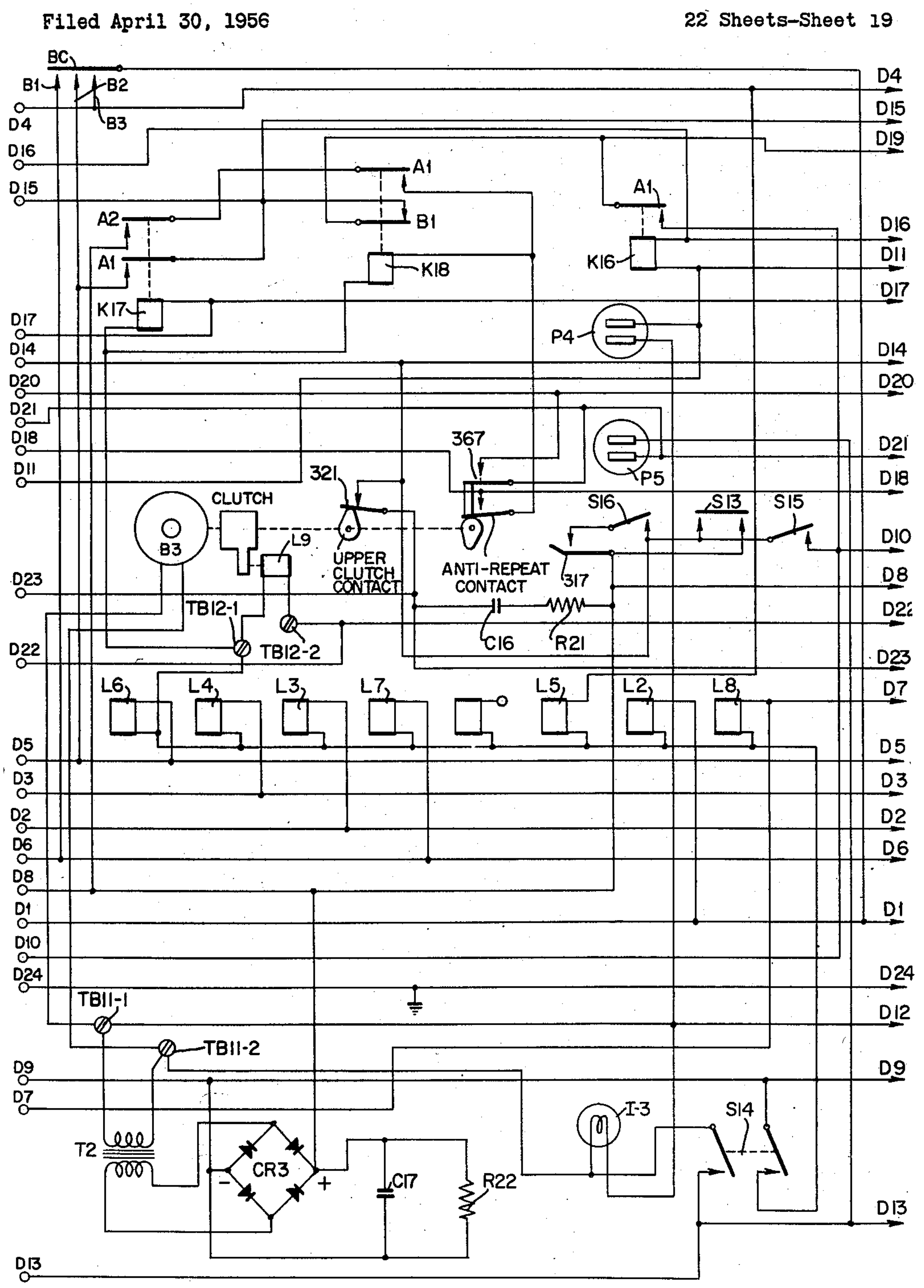

As previously stated, the upper case and shift release or lower case shift function are controlled by two different codes, namely by the upper case shift code and the lower case (shift release) code, respectively. Since both shifts operate the same cam, it is obvious that when the left shift operates the cam, a different code should be obtained and punched into a tape than when the right shift operates the cam. In order to accomplish this, it is necessary to have one set of contacts which are operated by a selector in the permutation unit and another pair of contacts 304 which are operated by the arm and roller assembly 298 which is part of the type basket shifting mechanism as shown in Fig. 13. When the 2, 4 and 6 points of the shift selector contacts (Fig. 18*g*) are closed by the shift cam action, a circuit is completed to the shift relay K13 in the typewriter. When the shift relay K13 is energized, its contacts A1, A2, A3, B3 and B2 are shorted to its contact B1, which is the positive side of the D. C. line. The contacts B3, B2, A2 and A1 of the shift relay K13 are connected to the punch selector magnets L2, L3, L5 and L6, respectively. The A3 contact of the shift relay K13 is connected to one side of the #2 shift toggle contacts (Fig. 18*g*). The other side of the #2 shift contact is connected to the 3 punch selector magnet L4. When the basket is shifted to the upper case position (basket down), the toggle arm 298 (Fig. 18*g*) operated by the basket movement (see Fig. 13) opens the #2 shift toggle contact breaking the circuit to the 3 punch selector magnet L4. The shift cam when operated causes the shift selector in the permutation unit to operate, shorting contacts 2, 4 and 6 which energize the shift relay K13. This completes a circuit to the punch selector magnets L2, L3, L5 and L6, respectively, perforating the upper case shift code holes in the tape. When the basket is shifted to the lower case position (basket up), the toggle arm 298 closes the 2 shift toggle contacts to the 3 punch selector magnet L4. Now as the shift selector in the permutation unit is operated, closing shift selector contacts 2, 4 and 6, and energizing the shift relay K13, a circuit is completed to the punch selector magnets L2, L3, L4, L5 and L6, respectively, to perforate the lower case (shift release) code into the tape.

Ordinarily in the typing of a line of material, one or more case shift operations may be required, either for the writing of capital letters or for the writing of special characters. It has been previously stated that a shift operation is required for shifting the type basket into upper case position and another shift operation to return it to the lower case position. Consequently, these functions may be rendered responsive to the signals representative of upper case and lower case positions, respectively. As noted by reference to the section of control tape in Fig. 14, the signal resulting normally in an upper case shift is that produced upon reading a tape having therein the 1—2—4—5 code, whereas that normally resulting in a lower case shift is produced by the 1—2—3—4—5 code.

When a 1—2—4—5 code signal is received on terminal A11, it is therefore a signal for the basket to shift into upper case position. Once having shifted into upper case position, the typewriter will normally continue to operate in such shifted position until the 1—2—3—4—5 code signal is received on terminal A12, whereupon the shift release will be operated and the basket will be shifted to its normal lower case position. An exemplary operation of this nature can be traced as follows. Assuming that a signal is received at terminal A11 as the result of a 1—2—4—5 code being read in the tape reader, a circuit is established to the K9–4 point of the shift control relay K9 (Fig. 18*f*), and through this normally closed point to plug hub 41 which is externally plugged to the hub 40. The hub 40 is internally wired to the hub 77 which itself is wired to the upper case shift solenoid L10. Thus having energized the upper case shift solenoid L10, the mechanism heretofore described will effectively shift the type basket into the upper case position.

Subsequently when the 1—2—3—4—5 code is read in the tape reader, voltage will appear on the terminal A12. This terminal is connected to the transfer point K9–1 of the shift control relay K9 which in its normal position closes a circuit to the plug hub 50 which is externally connected to the hub 49 from which the circuit can be traced to the shift release (lower case) solenoid L61 which controls the shifting of the type basket to the lower case position. The opposite side of the shift release solenoid L61 is connected to the functional common and results in the generation of a reader delay signal as previously described.

It is the primary object of this invention to provide a system in which successively received signals on the same input terminals can be differently interpreted. It frequently happens in the handling of coded material such as may appear on the punched control record tape that certain sequences of codes read from the tape are desirably given a different interpretation. Thus, in the present example using the shift signals, if successive shift codes are read from tape it may be desirable to interpret these shift codes in such manner as to enlarge the translating capacity of the typewriter. This is the essential function of the shift control relay K9 and the switching circuits of the plugboard. Ordinarily, with the points of the shift control relay K9 in their normal position, the plugboard will be so set up as to produce the called for function when the shift code pulse is received. Other circuits may be set up on the plugboard which are utilized upon the following receipt of the same signal by reason of a transfer of the points of the shift control relay K9. For an understanding of this alteration in function attention is directed to the simplified schematic drawings of Figs. 20 through 26 which disclose, by way of example, seven different plugboard arrangements for producing a variety of functions upon receipt of the shift signals on input terminals A11 and A12.

Figure 20:
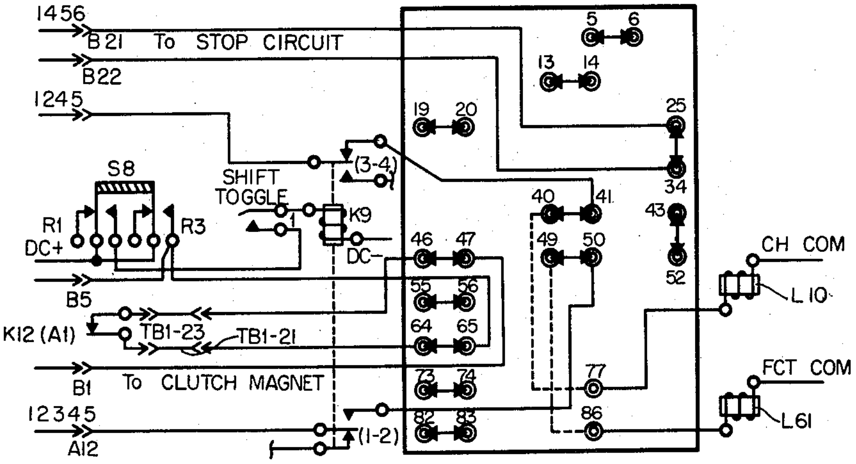

The plugboard set-up of Fig. 20 is such that the first occurrence of the upper case shift code 1—2—4—5 will shift the type basket to the upper case position, but a next following and successive signal received from the 1—2—4—5 code will be ignored, that is, the type basket will remain in the upper case position. When the first 1—2—4—5 signal is read from tape in the reader, the following A. C. circuit is completed. A voltage will be impressed on the terminal A11 which is connected through the normally closed 3—4 point of the shift control relay K9 and from thence to the plug hub 41. At this time it is pertinent to note that the plugboard is externally wired by connecting hub 5 to hub 6, hub 13 to hub 14, hub 19 to hub 20, hub 25 to hub 34, hub 40 to hub 41, hub 43 to hub 52, hub 49 to hub 50, hub 46 to hub 47, hub 55 to hub 56, hub 64 to hub 65, hub 73 to hub 74 and hub 82 to hub 83. The circuit extends from the plug hub 41 by way of external wiring to the plug hub 40, from the plug hub 40 by way of internal wiring to the plug hub 77 and from thence to the upper case shift solenoid L10 and to the other side of which is connected to the A. C. common.

When the upper case solenoid L10 is energized, the basket is shifted to the upper case position. Due to the movement of the type basket, the shift toggle 298 (Fig. 13) will close the shift toggle contact #1, completing a circuit from the positive R1 transferred point of the switch S8, the now closed shift toggle #1 and to the coil of the shift control relay K9. The shift control relay K9 is thereby energized, transferring its contacts 3—4 and 1—2. When the second 1—2—4—5 code is read and its signal is received, the circuit through the 3—4 point of the relay K9 is open and no voltage will appear at the plug hub 41. Consequently the shift solenoid L10 is unaffected. This in effect ignores this following shift signal and all others in sequence therewith.

Upon receipt of the first 1—2—3—4—5 signal, the circuit of Fig. 20 will result in the shifting of the type basket to its lower case position but the next following, and all succeeding 1—2—3—4—5 signals will be ignored. Under these conditions the circuit of Fig. 20 will function as follows. When the first 1—2—3—4—5 signal is received on terminal A12, the circuit is now completed through the transferred 1—2 point of the shift control relay K9, since the shift control relay K9 is still energized. This results in the application of voltage to the plug hub 50 which is externally plugged to the hub 49, and since the latter is internally connected to the hub 86, the shift release or lower case solenoid L61 will be energized. When the solenoid L61 is energized, the type basket will be shifted to its lower case position in the manner previously described. Due to the movement of the type basket, the shift toggle arm 298 will open the shift toggle point #1, deenergizing the shift control relay K9. This reslts in the return of the points 1—2 and 3—4 of the shift control relay to their normal position. Therefore, when the second lower case shift signal 1—2—3—4—5 is received, the points 1—2 of the relay K9 will be open and the circuit to the plug hub 50 will be broken. As a result of these circuit attitudes, no current will flow to the shift release solenoid L61 and the next following and all sequentially following lower case shift signals 1—2—3—4—5— will be ignored.

Figure 21:
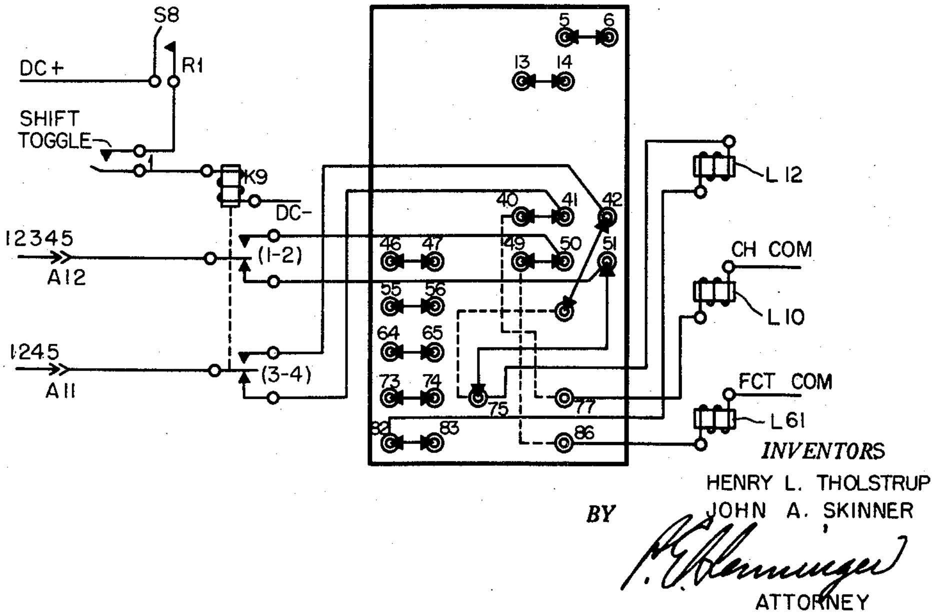

The diagram of Fig. 21 illustrates the plug-board set-up which will result in the function called for by the first shift signal, but which upon an immediately succeeding reoccurrence of the signal will result in the letter spacing function. In Fig. 21 it is to be noted that the essential external plugboard wiring consists of plugging hub 5 to hub 6, hub 13 to hub 14, hub 40 to hub 41, hub 46 to hub 47, hub 49 to hub 50, hub 55 to hub 56, hub 64 to hub 65, hub 73 to hub 74, hub 82 to hub 83, hub 42 to hub 59 and hub 51 to hub 75. With this set-up the first upper case shift signal 1—2—4—5 will cause the type basket to shift into its upper case position, while the next following 1—2—4—5 signal will operate the space function. When the first 1—2—4—5 signal is received on the terminal A11, the following A. C. circuit is completed. The line A11 being connected to the transfer point 3—4 of the shift control relay K9 will permit passage of voltage through the 3—4 points of the relay K9 in its normal position and from thence to the plug hub 41. Since the hub 41 is externally connected to the hub 40 and the latter is internally connected to the hub 77, the shift solenoid L10, which is connected to the hub 77, will be energized. When the upper case solenoid L10 is energized, the type basket will shift to its upper case position. Due to the movement of the basket, as described before, the toggle leg 298 will close the shift toggle #1, completing a circuit from the positive D. C. source, through the closed R1 point of the switch S8, the now closed shift toggle contact #1 and to the coil of the shift control relay K9. The shift control relay K9 is thereby energized, transferring its contacts 1—2 and 3—4.

When the second 1—2—4—5 code signal is received on the line A11, the circuit will be through the now transferred point 3—4 of the shift control relay K9 and from thence to the plugboard hub 42 which is externally wired to the hub 59 which in turn is wired internally to the hub 75 and from the latter to the space solenoid L12. When the space solenoid L12 is energized, the carriage spacing function will follow as previously described.

When the first shift release signal resulting from the reading of a 1—2—3—4—5 code is received on line A12 of Fig. 21, the type basket will be shifted to its lower case position. The next immediately following and each subsequent sequential 1—2—3—4—5 signal on line A12 will result in a letter spacing operation.

Upon the reading of the first shift release signal and the appearance of voltage on line A12 a circuit is completed through the now transferred 1—2 point of the shift control relay K9 to the plug hub 50. The plug hub 50 is externally plugged to the hub 49 which has an internal connection to the hub 86 from which the shift release solenoid L61 receives its power. Consequently, the voltage on this line will operate the shift release solenoid, causing the type basket to shift to the lower case position. Due to the movement of the type basket, the shift toggle 298 will open the shift toggle contact #1, thereby deenergizing the shift control relay K9. Therefore, the 1—2 and 3—4 points of the shift control relay K9 will return to their normal position. When the second shift release signal 1—2—3—4—5 is read and voltage appears on the line A12, the circuit is completed through the 1—2 points of the shift control relay K9 and to the plug hub 51 which by reference to Fig. 14 is now seen as wired externally to the hub 75. The hub 75 is connected to the space solenoid L12 which when energized results in a letter spacing operation. The circuit from the space solenoid L12 is continued to plug hub 82, which is externally wired to plug hub 83, and the latter by reference to Figs. 18*f* and 18*e* is returned to the A. C. common.

Figure 22:
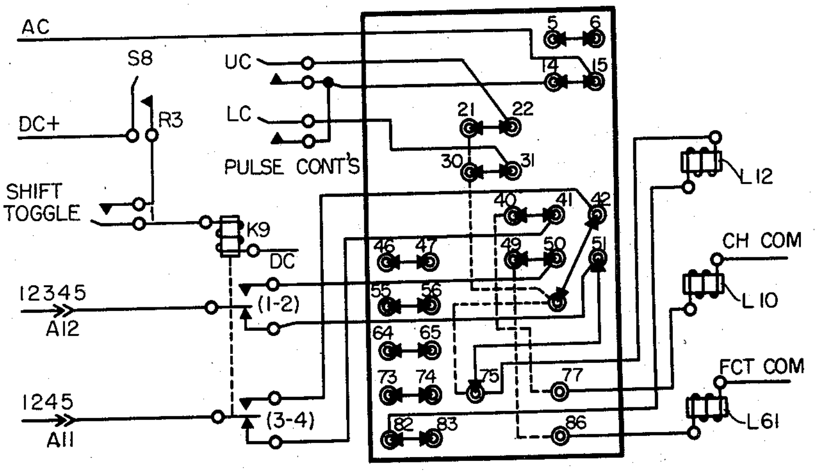

Fig. 22 shows the plugboard wiring required to obtain first normal operation of the shift signals together with a spacing operation and thereafter a spacing operation only. In this figure the plug hubs are externally wired as follows: hub 5 to hub 6, hub 14 to hub 15, hub 21 to hub 22, hub 30 to hub 31, hub 40 to hub 41, hub 42 to hub 59, hub 46 to hub 47, hub 49 to hub 50, hub 51 to hub 75, hub 55 to hub 56, hub 64 to hub 65, hub 73 to hub 74 and hub 82 to hub 83.

When the first 1—2—4—5 signal is read in the reader, voltage will appear on the line A11 which is part of a circuit completed through the 3—4 points of the shift control relay K9 in their normal position and to the plug hub 41. Plug hub 41, as stated, is externally wired to the plug hub 40 and the latter is internally wired to the plug hub 77 to which is connected the shift solenoid L10. The upper case solenoid L10 is energized, and this causes the type basket to shift into its upper case position. Due to the movement of the type basket, the shift toggle arm 298 will close the shift toggle contact #1, completing a circuit from line B8 through the now transferred R1 point, the now closed shift toggle contact #1 and to the coil of the shift control relay K9. The shift control relay K9 is now energized, transferring its contacts 1—2 and 3—4. Also, due to the movement of the basket the U. C. pulse contact 300 will close completing a circuit from the A. C. terminal TB8–1 through the plug hub 15 which is externally wired to the hub 14 and from thence through the now closed U. C. pulse contact and from thence back to the plug hub 22 which is externally wired to the plug hub 21 which is internally wired to the plug hub 30 and from the latter via internal wiring to the plug hub 59 which is internally wired to the hub 75 to which the space solenoid L12 is connected. The return circuit extends from the space solenoid L12 to the plug hub 82 from where a circuit can be traced to the functional common.

When the second upper case shift signal 1—2—4—5 is read and a pulse as a result thereof is received on line A11,, a circuit is completed through the transferred 3—4 points of the shift control relay K9 and to the plug hub 42 which is externally wired to the plug hub 59, in turn wired internally to the plug hub 75, whereupon voltage is delivered to the space solenoid L12 and from this solenoid again back to the functional common by way of the plug hub 82. Thus, it will be seen that the first occurrence of the upper case shift pulse on line A11 will result in the shifting of the type basket and the spacing of the carriage, whereas an immediately following pulse or pulses on the same line will result in carriage spacing only.

When the plugboard is set up as shown in Fig. 22, the first lower case shift pulse on line A12 resulting from the reading of the first 1—2—3—4—5 code will shift the basket to the lower case position and will also operate the letter spacing mechanism. The next successive signal on the line A12 will operate the space function only. When the first shift release or lower case shift signal 1—2—3—4—5 is read from the tape and a signal is present on line A12, a circuit will be completed through the transferred 1—2 points of the shift control relay K9 and to the plug hub 50. Plug hub 50 is externally connected to the hub 49, the hub 49 is internally connected to the hub 86, which in turn is connected to the shift release or lower case solenoid L61. A shift release or lower case shift function is therefore produced. Due to the movement of the type basket, the shift toggle 298 will open the shift toggle contact #1, deenergizing the shift control relay K9 and allowing its contacts to return to their normal position. Also due to the movement of the basket the LC pulse contact 296 (Figs. 13 and 18*h*) will close and complete a circuit from the A. C. supply terminal TB8–1 via the plug hub 15 which is externally wired to the plug hub 14 and from thence to the LC pulse contact, now closed, and back to the plug hub 31 which is externally wired to the plug hub 30 and by way of internal wiring from the plug hub 30 to the plug hubs 59 and 75 to the latter of which the space solenoid L12 is connected. The circuit is continued through the space solenoid L12 to the plug hub 82 and through the external wiring to plug hub 83 and from thence to the A. C. common, as seen in Figs. 12 et seq. This results in the energization of the space solenoid L12 and the consequent operation of the spacing function. When the second shift release or lower case shift signal 1—2—3—4—5 produces voltage on the line A12, the circuit is completed through the normal 1—2 points of the shift control relay K9 and to the plug 51 which is externally wired to the plug hub 75 and from thence to the space solenoid L12 for energizing this solenoid to cause a spacing operation but not a shifting operation.

Figure 23:
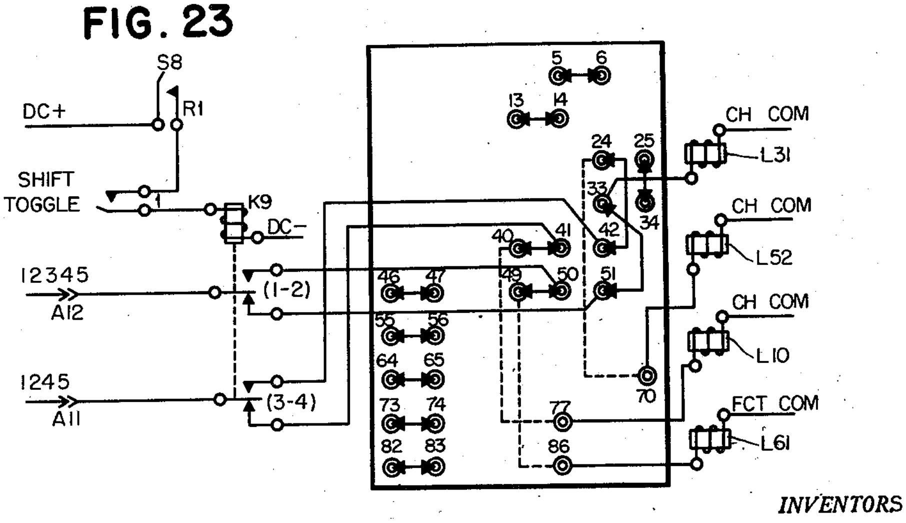

The plugboard wiring of Fig. 23 is that which is required for causing the normal function called for by the shift signals and the re-interpretation of these signals upon immediately succeeding appearances for energizing the solenoid L52 by which either the letters CR or the character $\overline{3}$ is printed depending on whether the type basket is in its upper case or lower case position. In this arrangement plug 5 is connected to hub 6, hub 13 is connected to hub 14, hub 24 is connected to hub 42, by external wiring, and to hub 70 by internal wiring, hub 25 is connected to hub 34, hub 33 is externally connected to hub 51, hub 40 is connected to hub 41, hub 40 is connected by internal wiring to hub 77, hub 50 is connected to hub 49 and hub 49 is internally connected to hub 86, hub 46 is connected to hub 47, hub 55 is connected to hub 56, hub 64 is connected to hub 65, hub 73 is conected to hub 74 and hub 82 is connected to hub 83.

With the plugboard set-up of Fig. 23, the signal produced on line A11 as the result of the reading of the upper case signal 1—2—4—5 will result in the shifting of the type basket to the upper case position. The next immediately following pulse on line A11 will energize the solenoid L52 which, since the type basket is in its upper case position, will print the characters CR. When the shift signal is received on line A11, a circuit is completed through the normal 3—4 points of the space control relay K9, and from thence to the plug hub 41 which is externally plugged to the hub 40 which in turn is internally connected to the hub 77 and from thence to the upper case shift solenoid L10. The upper case solenoid L10 is energized, causing the type basket to shift to the upper case position. Due to the movement of the basket the shift toggle arm 298 will close the shift toggle contact #1 and complete a circuit from the D. C. source on line B8, through the transferred R1 contact of the switch S8 and the now closed shift toggle contact #1 to the coil of the shift control relay K9. The shift control relay K9 is thus energized, transferring its contacts 1—2 and 3—4. Therefore, when the second pulse is received on line A11 as the result of the reading of an upper case signal from the tape a circuit is now established through the transferred contacts 3—4 of the shift control relay K9 and to the plug hub 42, which is externally wired to the plug hub 24, and through internal wiring from the plug hub 24 to the plug hub 70 to which the solenoid L52 is connected. Since the type basket is now in its upper case position, the character CR will be typed on the copy sheet in the typewriter.

Further, with the plugboard wiring of Fig. 23, when the first voltage on line A12 is received as the result of the lower case shift code 1—2—3—4—5 in the tape reader, the basket will be shifted to its lower case position and the second pulse on the line A12 received immediately thereafter will operate the solenoid L31 which functions to actuate the type lever having thereon the numeral 5 in the upper case position and the letter T in the lower case position. When the first reading of the 1—2—3—4—5 code is manifested by voltage on the line A12, a circuit is completed through the transferred points 1—2 of the shift control relay K9 and from thence to the plug hub 50 which is externally plugged to the hub 49, and from thence via internal wiring to the hub 86 to which the shift release or lower case solenoid L61 is connected. When the lower case solenoid L61 is then energized, the type basket is caused to shift to its lower case position. Due to the movement of the basket, the shift toggle arm 298 will open the shift toggle contact #1, deenergizing the shift control relay K9 and allowing the 1—2 and 3—4 points of this relay to return to their normal position. Therefore, when the second pulse arrives on line A12 as the result of the reading of an immediately succeeding 1—2—3—4—5 lower case shift code in the reader, a circuit is completed through the now normal 1—2 points of the shift control relay K9 and from thence to the plug hub 51 which is externally wired to the plug hub 33 to which the solenoid L31 is connected. When the solenoid L31 is energized, the letter T will be typed in the typewriter, since the type basket at this moment is in its lower case position.

Figure 24:
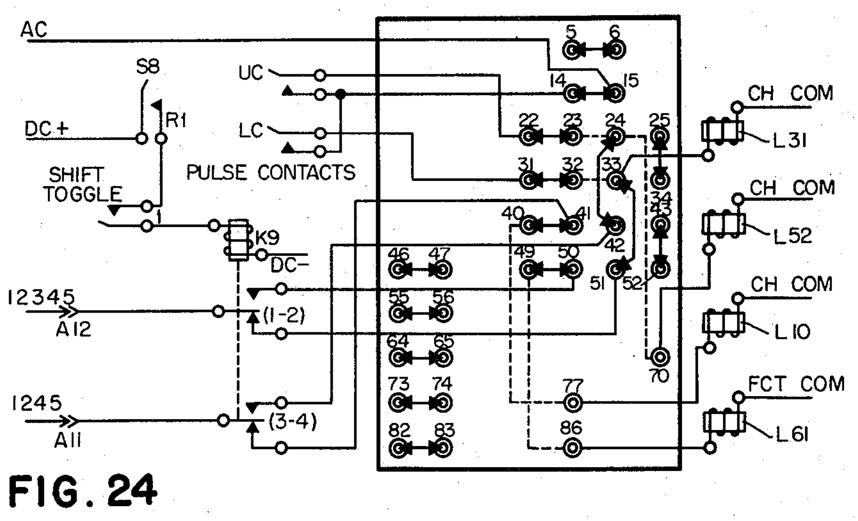

The plugboard arrangement of Fig. 24 will result in a shift function and a typing function upon the first occurrence of a pulse on line A11, whereas the next succeeding pulses on this line will result in the typing function alone. The plugboard wiring necessary for this operation is that in which plug hub 5 is externally wired to hub 6, hub 14 is wired to hub 15, hub 22 is wired to hub 23, hub 25 is wired to hub 34, hub 31 is wired to hub 32, hub 40 is wired to hub 41, hub 24 is wired to hub 42, hub 43 is wired to hub 52, hub 33 is wired to hub 51, hub 49 is wired to hub 50, hub 46 is wired to hub 47, hub 55 is wired to hub 56, hub 64 is wired to hub 65, hub 73 is wired to hub 74 and hub 82 is wired to hub 83.

With the arrangement of Fig. 24 the first signal on the line A11 resulting from the reading of the upper case shift code 1—2—4—5 in the tape reader will shift the basket to the upper case position and will also energize the solenoid L52 which, since the basket is now in the upper case position, will result in the typing of the characters CR. The second pulse on the line A11 as the result of an immediately following reading of the upper case shift code will energize the solenoid L52 with the result that the characters CR will be typed but no other function will be performed. When the first pulse is sensed on line A11 a circuit will be completed through the normal 3—4 contacts of the shift control relay K9 to the plug hub 41, which is externally wired to the hub 40, and from thence via internal wiring to the hub 77 to which the upper case shift solenoid L10 is connected. The upper case shift solenoid L10 is thereby energized and the type basket is shifted to the upper case position. Due to the movement of the basket, the shift toggle arm 298 will close the shift toggle contact #1, completing a circuit from the D. C. source on line B8, through the now transferred R1 contact of the switch S8, through the now closed shift toggle contact #1, to the coil of the shift control relay K9 by means of which this relay is energized and its points are transferred. Also due to the movement of the type basket, the upper case pulse contact arm 294 (Figs. 13 and 18*h*) will close the UC pulse contact, completing a circuit from the A. C. source at TB8–1 by way of the plug hub 15 which is externally connected to the hub 14, and from thence through the UC pulse contact and back to the plug hub 22 which is externally connected to the plug hub 23 and via internal wiring to the plug hub 24 which is internally wired to the plug hub 70 to which the solenoid L52 is connected. Energization of the solenoid L52 will result in the typing of the characters CR, since the type basket is in its upper case position at this time.

When the second pulse is received on the line A11 as the result of a next succeeding reading of the upper case shift signal 1—2—4—5, a circuit is completed through the transferred 3—4 points of the shift control relay K9 to the plug hub 42 which is externally wired to the hub 24 and from thence via internal wiring to the hub 70 to which the solenoid L52 is connected. Thus, upon the succeeding manifestation of the upper case shift signal the characters CR will be typed without additional functional operations being performed.

When voltage appears on the line A12, as a result of the reading of the lower case or shift release code 1—2—3—4—5 in the reader, the type basket will be returned to its lower case position and the solenoid L31 will also be energized for the typing of the letter T. The second pulse on the line A12 as a result of the reading of the lower case shift signal will energize the solenoid L31 for the typing of the letter T but will cause no additional functions within the typewriter.

When the first pulse arrives on the line A12 a circuit is completed through the 1—2 transferred points of the shift control relay K9 and from thence to the plug hub 50 which is externally wired to the hub 49 and from there via internal wiring to the hub 86 to which the shift release solenoid L61 is connected. The shift release or lower case solenoid L61 is thereby energized, causing the type basket to shift to its lower case position. Due to the movement of the type basket, the shift toggle arm 298 will open the shift toggle contact #1, thereby deenergizing the shift control relay K9, allowing its points 1—2 and 3—4 to return to normal. Also due to the basket movement the LC pulse contact will be closed by the contact arm 296. A circuit is, therefore, completed from the A. C. source TB8–1, through the plug hub 15, which is externally wired to the hub 14, and from thence to the now closed LC pulse contacts and from this point back into the plugboard at plug hub 31, which is externally wired to the hub 32 and via internal wiring to the hub 33 to which the solenoid L31 is connected. The solenoid L31 will result in the typing of the letter T, since the type basket is now in its lower case position.

When the second lower case shift signal 1—2—3—4—5 produces voltage on the line A12, a circuit is completed through the normal 1—2 contacts of the shift control relay K9 to the plug hub 51, which is externally connected to the hub 33 and from thence to the solenoid L31. The solenoid L31 is thereby energized to cause the typing of the number 5 since the type basket is now in its lower case position.

Figure 25:
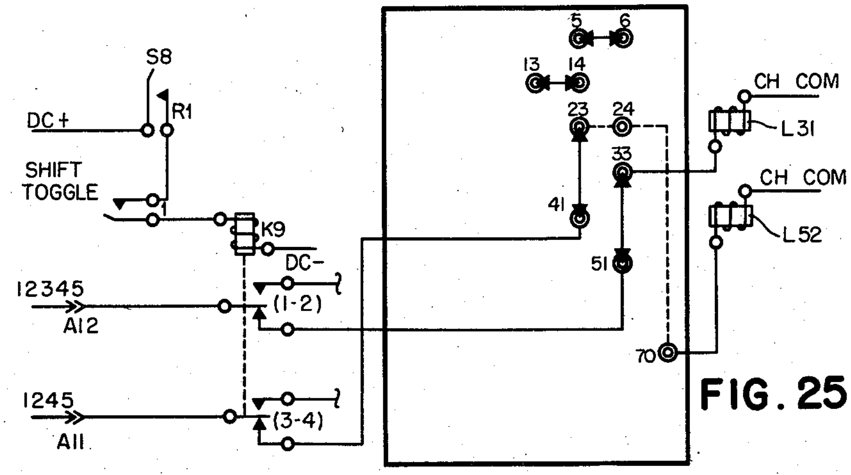

Fig. 25 shows the plugboard wiring necessary for the typing of a character upon the reading of successive shift signals including the reading of the first character. For this function plug hub 5 is externally connected to hub 6, hub 13 is connected to hub 14, hub 23 is connected to hub 41 and hub 33 is connected to hub 51. When the first upper case shift signal 1—2—4—5 is read, and voltage appears on the line A11, a circuit is completed through the normal 3—4 points of the shift control relay K9 to the plug hub 41 which is externally connected to the hub 23, and since the latter is internally connected to the hub 24 and from thence via internal connection to the hub 70 to which the solenoid L52 is connected, the solenoid L52 will be energized with the result that the character $\overline{8}$ is written. It will be noted that the character $\overline{8}$ occupies the normal lower case position and is utilized by reason of the fact that the type basket was not shifted. Also, due to the fact that the type basket has not been shifted, the shift toggle point #1 remains open, so that there is no circuit to the coil of the shift control relay K9. Its points will, therefore, remain normal. If then a second shift signal is received on the line A11, the circuit is as previously described and the character $\overline{8}$ will again be typed.

With the plugboard set-up of Fig. 25, voltage on line A12 resulting from the reading of the lower case shift code 1—2—3—4—5 will pass through the 1—2 points of the shift control relay K9 in their normal position and to the plug hub 51 which is externally wired to the plug hub 33 to which is connected the solenoid L31. When the solenoid L31 is energized, the letter T will be printed, since the type basket is in its lower case position. Here again it is to be noted that since there was no shifting of the type basket, the shift toggle #1 remains open and the coil of the shift control relay K9 remains deenergized with the result that the contacts 1—2 and 3—4 of the shift control relay K9 remain in their normal position. Because of the remaining normal position of the contacts of the shift control relay K9, the second succeeding pulse on the line A12 will again result in the typing of the letter T, the circuit being the same as it was at the time the first upper case shift signal was received on line A12.

Figure 26:
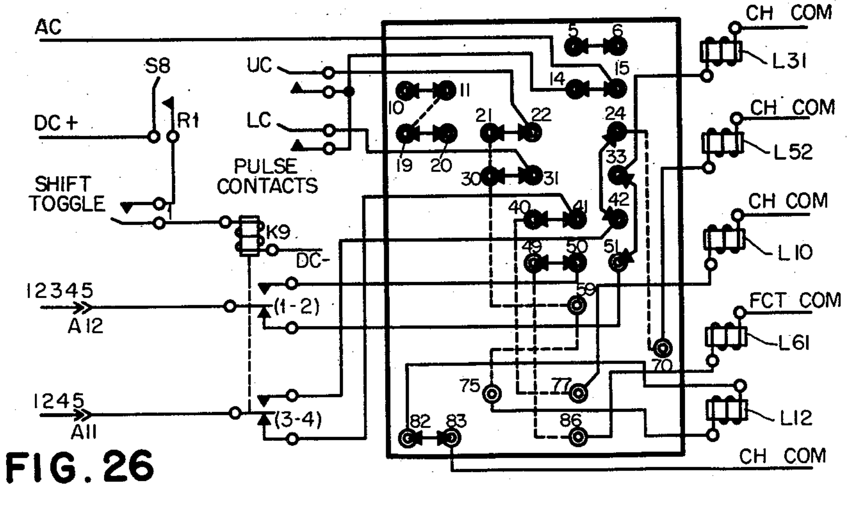

The plugboard arrangement of Fig. 26 illustrates the wiring necessary to interpret a first code such that a shift and a space function will occur as a result of the first shift code sensed and a character will be typed as a result of an immediately subsequent shift code signal. In Fig. 26 it will be seen that plug hub 5 is externally wired to hub 6, hub 10 is wired to hub 11, hub 14 is wired to hub 15, hub 19 is wired to hub 20, hub 21 is wired to hub 22, hub 24 is wired to hub 42, hub 30 is wired to hub 31, hub 40 is wired to hub 41, hub 49 is wired to hub 50, hub 33 is wired to hub 51 and hub 82 is wired to hub 83.

When the first upper case shift signal 1—2—4—5 produces voltage on line A11 and the plugboard is wired as shown in Fig. 26, a circuit will be completed through the 3—4 contacts of the shift control relay K9 in their normal position to the plug hub 41, which hub is externally wired to the hub 40, and via internal wiring to the hub 77 to which the upper case shift solenoid L10 is connected. When the solenoid L10 is energized, the type basket will be shifted into its upper case position. Due to the movement of the basket the shift toggle arm 298 will close the shift toggle contact #1 as before and thereby complete a circuit through the now transferred R1 point of the switch S8, the closed shift toggle point #1 and the coil of the shift control relay K9. The shift control relay K9 is thereby energized to transfer its contacts 1—2 and 3—4. Also, due to the movement of the type basket, the upper case pulse contact arm 294 will close the UC pulse contacts completing a circuit from the A. C. source TB8–1, through the plug hub 15, via external wiring to the plug hub 14 and through the closed UC pulse contacts 300 back to the plug hub 22 and via external wiring to the plug hub 21, which is internally wired to the hub 59 and from thence via internal wiring to the hub 75 to which the space solenoid L12 is connected. The return circuit from the space solenoid L12 is via the plug hubs 82 and 83. When the space solenoid L12 is energized a letter spacing operation will be performed in the typewriter.

When the second upper case shift signal is read and a next succeeding pulse is present on the line A11, a circuit is completed through the 3—4 transferred points of the shift control relay K9 and from thence to the plug hub 42 which is externally wired to the plug hub 24 and by internal wiring to hub 70 to which the solenoid L52 is connected, this being the solenoid controlling the typing of the characters CR and the $\overline{3}$. Since the type basket is in the upper case position, the characters CR will be typed.

When the first reading of the lower case shift code 1—2—3—4—5 causes voltage on the line A12, a circuit is closed to shift the basket to the lower case position and to also cause letter spacing. The second pulse on line A12 resulting from the next following reading of the lower case shift code 1—2—3—4—5 will operate the solenoid L31 and cause the typing of the letter T. When the first lower case shift pulse is present on line A12, a circuit is completed through the transferred contacts 1—2 of the shift control relay K9 and from thence to the plug hub 50 which is externally wired to the plug hub 49 and from thence via internal wiring to the plug hub 86 to which the lower case shift solenoid L61 is connected. The lower case solenoid L61 is thereby energized causing the type basket to shift to its lower case position. Due to the movement of the type basket, the shift toggle contact arm 298 will open the shift toggle contact #1, deenergizing the shift control relay K9 and allowing its contacts 1—2 and 3—4 to return to normal. Also, due to the movement of the type basket, the lower case pulse contact arm 296 will close the LC pulse contacts 302 and thereby complete a circuit from the A. C. source TB8–1 to the plug hub 15 and via external wiring and the plug hub 14 to the now closed LC pulse contacts and from thence to the plug hub 31 and via external wiring to the plug hub 30 and from thence via internal wiring to the plug hub 59 and the plug hub 75 to which the space solenoid L12 is connected, the return from the space solenoid being through plug hubs 82 and 83 connected by external wiring. The space solenoid L12 is, therefore, energized, operating the space function. When the second lower case shift signal 1—2—3—4—5 causes voltage on the line A12, a circuit is completed through the now normal 1—2 points of the space control relay K9 and from thence to the plug hub 51. The plug hub 51 is connected by external wiring to the plug hub 33 to which is connected the solenoid L31. When the solenoid L31 is energized, the letter T is typed in the typewriter because the type basket is now in its lower case position.

While the fundamental novel features of the invention have been illustrated and described in connection with sequential case shift signals, it is to be understood that these signals have been selected merely for the purpose of illustrating the invention. Furthermore, no effort has been made at an exhaustive presentation of all the wiring arrangements that are possible. It is believed that the examples given will enable others skilled in the art to apply the principles of the invention in a great variety of modifications and forms.

What is claimed is:

1. In a power operated typewriter having case shift mechanism and a carriage spacing mechanism, a plurality of solenoids for controlling typewriter functions including a case shift solenoid for controlling said case shift mechanism and a spacing solenoid for controlling said carriage spacing mechanism, a source of control signals for selectively energizing said solenoids, a normally closed case shift circuit for a control signal from said signal source to said case shift solenoid, a normally open circuit to said spacing solenoid, and means operative upon energization of said case shift solenoid to open said normally closed case shift circuit and to close said normally open spacing solenoid circuit.

2. In a power operated typewriter having case shift mechanism and a carriage spacing mechanism, a plurality of solenoids for controlling typewriter functions including a case shift solenoid for controlling said case shift mechanism and a spacing solenoid for controlling said carriage spacing mechanism, a source of control signals for selectively energizing said solenoids, a normally closed case shift circuit for a control signal from said signal source to said case shift solenoid, a normally open circuit to said spacing solenoid, means responsive to a case shifting operation to close said normally open spacing solenoid circuit, and a concurrent signal source for energizing said spacing solenoid circuit, whereby a concurrent case shifting and spacing operation is effected.

3. In a power operated typewriter having case shift mechanism and a carriage spacing mechanism, a plurality of solenoids for controlling typewriter functions including a case shift solenoid for controlling said case shift mechanism and a spacing solenoid for controlling said carriage spacing mechanism, a source of control signals for selectively energizing said solenoids, a normally closed case shift circuit for a control signal from said signal source to said case shift solenoid, a normally open spacing solenoid circuit to said spacing solenoid, a relay for opening said normally closed case shift circuit and for closing said normally open spacing solenoid circuit, a normally open power circuit for energizing said relay, and means associated with said case shift mechanism for closing said power circuit when said case shift mechanism is operated under control of said case shift solenoid, whereby said relay is energized and said normally closed case shift circuit is opened and said normally open spacing solenoid circuit is closed.

4. In a power operated typewriter having case shift mechanism and a carriage spacing mechanism, a plurality of solenoids for controlling typewriter functions including a case shift solenoid for controlling said case shift mechanism and a spacing solenoid for controlling said carriage spacing mechanism, a source of control signals for selectively energizing said solenoids, a normally closed case shift circuit for a control signal from said signal source to said case shift solenoid, a normally open circuit from said signal source to said spacing solenoid, and a relay operative upon energization of said case shift solenoid to open said normally closed case shift circuit and to close said normally open spacing solenoid circuit.

5. In a power operated typewriter having case shift mechanism and a character type lever, a plurality of solenoids for controlling typewriter functions including a case shift solenoid for controlling said case shift mechanism and a type solenoid for controlling said type lever, a source of control signals for selectively energizing said solenoids, a normally closed case shift solenoid circuit for a control signal from said signal source to said case shift solenoid, a normally open type solenoid circuit from said signal source to said type solenoid, and means operative upôn energization of said case shift solenoid in response to a signal on said normally closed case shift solenoid circuit for opening said normally closed case shift solenoid circuit and for closing said normally open type solenoid circuit whereby a following control signal on said circuit will energize said type solenoid.

6. In a power operated typewriter having case shift mechanism and a type lever, a plurality of solenoids for controlling typewriter functions including a case shift solenoid for controlling said case shift mechanism and a type solenoid for controlling said type lever, a source of control signals for selectively energizing said solenoids, a normally closed case shift circuit for a control signal from said signal source to said case shift solenoid, a normally open type solenoid circuit from said signal source to said type solenoid, a relay for opening said normally closed case shift circuit and for closing said normally open type solenoid circuit, a normally open power circuit for energizing said relay, and means associated with said case shift mechanism for closing said power circuit when said case shift mechanism is operated under control of said case shift solenoid, whereby said relay is energized and said normally closed case shift circuit is opened and said normally open type soleneoid circuit is closed.

7. In a power operated typewriter having case shift mechanism and a character type lever, a plurality of solenoids for controlling typewriter functions including a case shift solenoid for controlling said case shift mechanism and a type solenoid for controlling said character type lever, a source of control signals for selectively energizing said solenoids, a normally closed case shift circuit for a control signal from said signal source to said case shift solenoid, a normally open circuit from said signal source to said type solenoid, and means operative upon energization of said case shift solenoid to open said normally closed case shift circuit and to close said normally open type solenoid circuit.

8. In a power operated typewriter having case shift mechanism and a character type lever, a plurality of solenoids for controlling typewriter functions including a case shift solenoid for controlling said case shift mechanism and a type solenoid for controlling said character type lever, a source of control signals for selectively energizing said solenoids, a normally closed case shift circuit for a control signal from said signal source to said case shift solenoid, a normally open circuit from said signal source to said type solenoid, and a relay operative upon energization of said case shift solenoid to open said normally closed case shift circuit and to close said normally open type solenoid circuit.

9. In a power operated typewriter having case shift mechanism, a plurality of solenoids for controlling typewriter functions including a case shift solenoid for controlling said case shift mechanism and a functional solenoid for controlling a typewriter function independent of said case shift mechanism, a source of case shift control signals for energizing said case shift solenoid, a normally closed case shift circuit for a case shift control signal from said signal source to said case shift solenoid, a normally open circuit from said signal source to said functional solenoid, a control relay for opening said normally closed case shift circuit and for closing said normally open circuit, a normally open power circuit for energizing said control relay, and means associated with said case shift mechanism for closing said power circuit when said case shift mechanism is operated under control of said case shift solenoid, whereby said relay is energized and said normally closed case shift circuit is open and said normally open circuit is closed to cause energization of said functional solenoid upon presence of a subsequent case shift signal.

10. In a power operated typewriter having case shift mechanism, a carriage spacing mechanism and a character type lever, a plurality of solenoids for controlling typewriter functions including a case shift solenoid for controlling said case shift mechanism, a spacing solenoid for controlling said carriage spacing mechanism, and a type solenoid for controlling said type lever, case shift signal source, a normally closed case shift circuit for a case shift signal from said signal source to said case shift solenoid, a normally open circuit from said signal source to said spacing solenoid and said type solenoid, means for selectively connecting said spacing solenoid and said type solenoid into said normally open circuit, a control relay for opening said normally closed case shift circuit and for closing said normally open circuit, a normally open power circuit for energizing said control relay, and means associated with said case shift mechanism for closing said power circuit when said case shift mechanism is operated under control of said case shift solenoid, whereby said control relay is energized and said normally closed case shift circuit is opened and said normally open circuit to the selectively connected solenoid is closed to cause energization of the selectively connected solenoid upon presence of a subsequent case shift signal.

References Cited in the file of this patent

UNITED STATES PATENTS

| | | |
|---|---|---|
| 2,240,562 | Lake et al. | May 6, 1941 |
| 2,464,608 | Rabenda et al. | Mar. 15, 1949 |